US012800932B2

(12) United States Patent
Tso et al.

(10) Patent No.: US 12,800,932 B2
(45) Date of Patent: Nov. 17, 2026

(54) LAMINATED GLASS AND HEAD-UP DISPLAY SYSTEM

(71) Applicant: FUYAO GLASS INDUSTRY GROUP CO., LTD., Fuqing (CN)

(72) Inventors: Fai Tso, Fuqing City (CN); Lishan He, Fuqing City (CN); Fengzhu Huang, Fuqing City (CN); Dong Zeng, Fuqing City (CN); Guofu Chen, Fuqing City (CN); Xiaorong Zhang, Fuqing City (CN); Kohta Fukuhara, Fuqing City (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 205 days.

(21) Appl. No.: 18/726,087

(22) PCT Filed: Jan. 17, 2023

(86) PCT No.: PCT/CN2023/072616

§ 371 (c)(1),
(2) Date: Jul. 1, 2024

(87) PCT Pub. No.: WO2023/134775

PCT Pub. Date: Jul. 20, 2023

(65) Prior Publication Data

US 2025/0155713 A1 May 15, 2025

(30) Foreign Application Priority Data

Jan. 17, 2022 (CN) ......................... 202210047539.7

(51) Int. Cl.

*G02B 27/01* (2006.01)
*G02B 1/10* (2015.01)

(Continued)

(52) U.S. Cl.

CPC ........... *G02B 27/0172* (2013.01); *G02B 1/10* (2013.01); *G02B 5/3066* (2013.01); *B82Y 20/00* (2013.01)

(58) Field of Classification Search

None

See application file for complete search history.

(56) References Cited

U.S. PATENT DOCUMENTS 6,952,312 B2 * 10/2005 Weber ............... B32B 17/10458
359/630
2021/0316533 A1 10/2021 Fischer et al.

FOREIGN PATENT DOCUMENTS

CN 104267498 A 1/2015
CN 204166197 U 2/2015

(Continued)

OTHER PUBLICATIONS

International search report issued for counterpart Chinese patent application No. PCT/CN2023/072616 mailed on Apr. 26, 2023 (3 pages).

(Continued)

*Primary Examiner* — Dung T Nguyen

(74) *Attorney, Agent, or Firm* — Nutter McClennen & Fish LLP

(57) ABSTRACT

Provided in the embodiments of the present disclosure are a laminated glass and a head-up display system. The laminated glass includes: an inner glass plate, an interlayer film and an outer glass plate, in which a side of the inner glass plate away from the interlayer film is provided with a first transparent nano-coating for reflecting P-polarized light, the first transparent nano-coating includes at least one stacked structure composed of a high-refractive-index material layer and a low-refractive-index material layer which are sequentially deposited outwards from a surface of the inner glass plate, a second transparent nano-coating includes dielectric (Continued)

layers and electrically conductive layers, and each of the electrically conductive layers is sandwiched between two of the dielectric layers; the high-refractive-index material layer has a refractive index greater than or equal to 1.9, the low-refractive-index material layer has a refractive index less than or equal to 1.8.

19 Claims, 2 Drawing Sheets

(51) Int. Cl.

| | |
|---|---|
| ***G02B 5/30*** | (2006.01) |
| *B82Y 20/00* | (2011.01) |

(56) References Cited

FOREIGN PATENT DOCUMENTS

| | | | |
|---|---|---|---|
| CN | 106630688 | A | 5/2017 |
| CN | 106646874 | A | 5/2017 |
| CN | 111433022 | A | 7/2020 |
| CN | 111433023 | A | 7/2020 |
| CN | 113071165 | A | 7/2021 |
| CN | 113238378 | A | 8/2021 |
| CN | 113826040 | A | 12/2021 |
| CN | 114349371 | A | 4/2022 |
| JP | 2024535847 | A | 10/2024 |
| WO | 2021104800 | A1 | 6/2021 |
| WO | 2021122848 | A1 | 6/2021 |
| WO | 2023110261 | A1 | 6/2023 |

OTHER PUBLICATIONS

Search report issued on Aug. 4, 2022 for counterpart Chinese patent application No. 202210047539.7 with machine EN translation (5 pages).

First Office Action issued for corresponding Japanese Patent Application 2024-562220 mailed on Jun. 24, 2025 (17 pages).

Amrani, D., "Teaching optic laboratory: Understanding the reflection and transmission of polarized light—Fresnel's equations—Brewster's angle and index of refraction of two transparent materials", Journal of Science Education, 2022 vol. 23, No. 1 (6 pages).

Extended European Search Report issued on Mar. 20, 2025 for counterpart European patent application No. 23740116.1 (9 pages).

Notice for grant issued for corresponding Japanese Patent Application 2024-562220 mailed on Jan. 6, 2026 (5 pages).

* cited by examiner

LAMINATED GLASS AND HEAD-UP DISPLAY SYSTEM

CROSS-REFERENCE TO RELATED APPLICATION

This application is a National Stage of International Application No. PCT/CN2023/072616, filed Jan. 17, 2023, which claims priority to Chinese Patent Application No. 202210047539.7, filed Jan. 17, 2022.

TECHNICAL FIELD

The present disclosure relates to the technical field of head-up display, and particularly to a laminated glass and a head-up display system.

BACKGROUND

The head-up display system (HUD) is being increasingly widely applied in automobiles and other fields, and the configuration of the laminated glass is one of the key points in the designing of the head-up display system.

At present, the prior laminated glass is usually provided with a coating that can reflect P-polarized light on an inner glass plate. However, the refractive index of the high-refractive-index material used in the coating is not high enough, it is difficult to obtain the P-polarized light reflectivity that meets the high-quality use requirement for the head-up display system. Meanwhile, the simple superposition of two coatings in the prior laminated glass cannot make the P-polarized light reflection spectrum of the laminated glass sufficiently smooth, and the unsmoothed P-polarized light reflection spectrum will significantly affect the display quality of projected images, thereby seriously affecting the driving comfort of an automobile equipped with the head-up display system.

In other words, all the prior laminated glass has the problems of a low P-polarized light reflectivity and a poor smoothness of the P-polarized light reflection spectrum.

SUMMARY

The present disclosure provides a laminated glass and a head-up display system to solve the problems in the prior art, which can simultaneously improve the P-polarized light reflectivity of the laminated glass and the smoothness of the P-polarized light reflection spectrum, thereby effectively improving the brightness and the display comfort of the head-up display system using the laminated glass, and being more helpful to meet the commercialization requirement on the laminated glass and improve the use experiences of users.

In order to solve the above technical problems, the present disclosure provides the following technical solutions.

In a first aspect, the present disclosure provides a laminated glass, including an inner glass plate, an outer glass plate and an interlayer film sandwiched therebetween, a side of the inner glass plate away from the interlayer film being provided with a first transparent nano-coating for reflecting P-polarized light, and the first transparent nano-coating including at least one stacked structure composed of a high-refractive-index material layer which is sequentially deposited outwards from a surface of the inner glass plate and a low-refractive-index material layer, wherein a second transparent nano-coating attached to the interlayer film is sandwiched between the inner glass plate and the outer glass plate, the second transparent nano-coating includes dielectric layers and electrically conductive layers, and each of the electrically conductive layers is sandwiched between two of the dielectric layers;

- wherein the high-refractive-index material layer has a refractive index greater than or equal to 1.9, the low-refractive-index material layer has a refractive index less than or equal to 1.8, and the laminated glass has a P-polarized light reflectivity Rp greater than or equal to 16% at an incident angle of 65°.

Further, a reflection spectrum corresponding to the P-polarized light reflectivity Rp of the laminated glass at the incident angle of 65° is within a waveband of 460 nm to 630 nm.

The technical solution has the advantageous effects that it is possible to achieve color-neutral displaying of a projected image on the laminated glass as much as possible without significant local minimum and maximum to meet aesthetic requirements, thereby effectively improving the color developing neutrality and the comfort of a head-up display system using the laminated glass, and effectively improving the user's driving comfort.

Further, the laminated glass has a direct solar reflectivity Rds greater than or equal to 20%.

The technical solution has the advantageous effects that it is possible to effectively improve the direct solar reflectivity on the laminated glass and the heat insulation effect of the laminated glass, thereby effectively improving the heat insulation effect of a head-up display system using the laminated glass, which is more helpful to meet commercialization requirement and improve the use experiences of users. In addition, the second transparent nano-coating includes the electrically conductive layers, which is suitable for electric heating and capable of quick dehumidifying, defogging and even deicing. Therefore, the laminated glass of the present disclosure can also have an electric heating function, and is very suitable for power sources of 8 V to 48 V. When being provided with busbars, the transparent electrically conductive film second transparent nano-coating may be connected to an electrode of a power source to introduce current into the transparent electrically conductive film second transparent nano-coating over as large a portion of the glass plate width as possible.

Further, a single-sided P-polarized light reflectivity R1p of the first transparent nano-coating at the incident angle of 65° is greater than or equal to 6%.

Further, a single-sided P-polarized light reflectivity R1p of the first transparent nano-coating at the incident angle of 65° is greater than or equal to 15%.

The technical solution has the advantageous effects that as the P-polarized light reflectivity R1p of the first transparent nano-coating increases, it is more conducive to improving the ratio R1p/Rp, thereby increasing the design freedom of the second transparent nano-coating without depending on the wedge-shaped interlayer film and/or lowering the requirement on the second transparent nano-coating.

Further, the high-refractive-index material layer has a refractive index greater than or equal to 2.4, and the low-refractive-index material layer has a refractive index less than or equal to 1.6.

The technical solution has the advantageous effects that by matching the high-refractive-index material layer with the low-refractive-index material layer, the requirements on the first transparent nano-coating can be realized. Meanwhile, it is helpful to improve the appearance of the head-up display system using the laminated glass.

Further, at least one of the high-refractive-index material layers has a thickness greater than or equal to 45 nm, and a refractive index greater than or equal to 2.4.

The technical solution has the advantageous effects that it is helpful to achieve a high spectral smoothness of the P-polarized light and improve the appearance of the HUD.

Further, the reflection spectrum corresponding to the P-polarized light reflectivity Rp of the laminated glass at the incident angle of 65° has a range less than or equal to 4% in the wavelength range from 460 nm to 630 nm.

The technical solution has the advantageous effects that it is possible to effectively improve the smoothness of the P-polarized light reflection spectrum of the laminated glass, so as to further achieve the color-neutral displaying of the projected image on the laminated glass as much as possible without significant local minimum and maximum to meet aesthetic requirements, thereby effectively improving the color developing neutrality and the comfort of a head-up display system using the laminated glass, and effectively improving the user's driving comfort.

Further, the reflection spectrum corresponding to the P-polarized light reflectivity Rp of the laminated glass at the incident angle of 65° has a range less than or equal to 2% in the wavelength range from 460 nm to 630 nm.

The technical solution has the advantageous effects that it is possible to further improve the smoothness of the P-polarized light reflection spectrum of the laminated glass, so as to further achieve the color-neutral displaying of the projected image on the laminated glass as much as possible, and better meet the commercialization requirements.

Further, a P-polarized light reflection spectrum corresponding to a single-sided P-polarized light reflectivity R1p of the first transparent nano-coating at the incident angle of 65° has a range of range1 within a waveband of 460 nm to 630 nm;

a P-polarized light reflection spectrum corresponding to a single-sided P-polarized light reflectivity R2p of the second transparent nano-coating at the incident angle of 65° has a range of range2 in the wavelength range from 460 nm to 630 nm;

wherein |range1+range2|≤6%.

Further, |range1+range2|≤3%.

The technical solution has the advantageous effects that it is helpful to smooth the P-polarized light reflection spectrum of the laminated glass in the wavelength range from 460 nm to 630 nm even if the wavelengths corresponding to maximum and minimum values of the P-polarized light spectral reflectivity of the first transparent nano-coating are completely consistent with those corresponding to maximum and minimum values of the P-polarized light spectral reflectivity of the second transparent nano-coating respectively.

Further, a P-polarized light reflection spectrum corresponding to a single-sided P-polarized light reflectivity R1p of the first transparent nano-coating at the incident angle of 65° has a range of range1≤12% within a waveband of 460 nm to 630 nm.

Further, range1≤2%.

The technical solution has the advantageous effects that it is possible to improve the smoothness of the P-polarized light reflection spectrum of the laminated glass, and effectively avoid the appearance of the laminated glass from being affected.

Further, a P-polarized light reflection spectrum corresponding to a single-sided P-polarized light reflectivity R2p of the second transparent nano-coating at the incident angle of 65° has a range of range2≤8% within a waveband of 460 nm to 630 nm.

Further, range2≤2%.

The technical solution has the advantageous effects that it is possible to further improve the smoothness of the P-polarized light reflection spectrum of the laminated glass, and effectively avoid the appearance of the laminated glass from being affected.

Further, the laminated glass has a direct solar reflectivity Rds greater than or equal to 30%.

The technical solution has the advantageous effects that it is possible to effectively improve the direct solar reflectivity on the laminated glass and the heat insulation effect of the laminated glass, thereby effectively improving the heat insulation effect of a head-up display system using the laminated glass, which is more helpful to meet commercialization requirement and improve the use experiences of users.

Further, the high-refractive-index material layer includes a first compound including at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements;

Further, the first compound includes at least one from a group consisting of SiN, ZnSnOx, ZnSnMgOx, TiOx, SiZIN and ZrN.

Further, the first compound includes at least one from a group consisting of an oxide of Ti, an oxynitride of Ti, a nitride of Ti and a Ti metal.

Further, the oxide of Ti includes a first metal element and/or a compound thereof;

wherein the first metal element includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements.

Further, a mass percentage of the first metal element in the oxide of Ti is less than or equal to 40%.

Further, a mass percentage of the first metal element in the oxide of Ti is less than or equal to 5%.

Further, the oxynitride of Ti includes a second metal element and/or a compound thereof;

wherein the second metal element includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements.

Further, a mass percentage of the second metal element in the oxynitride of Ti is less than or equal to 40%.

Further, a mass percentage of the second metal element in the oxynitride of Ti is less than or equal to 5%.

Further, the low-refractive-index material layer includes a second compound including at least one from a group consisting of an oxide of Si, an oxynitride of Si, a carbon oxide of Si, an oxide of Al and a mixture of Si.

Further, the oxide of Si, the oxynitride of Si or the carbon oxide of Si includes a third metal element and/or a compound thereof;

wherein the third metal element includes at least one from a group consisting of Zr, Nb, Ti, Sb, Sn, Zn, In, Ni, Cr, Mg, Mn, V, W, Hf, Ta, Mo, Ga, Y, Bi, Ta and rare earth elements.

Further, a mass percentage of the third metal element in the oxide of Si is less than or equal to 30%.

Further, a mass percentage of the third metal element in the oxide of Si is less than or equal to 10%.

Further, the first transparent nano-coating includes a first high-refractive-index material layer and a first low-refractive-index material layer;

wherein the first high-refractive-index material layer has a thickness between 45 nm and 120 nm;

the first low-refractive-index material layer has a thickness between 90 nm and 200 nm.

Further, the first transparent nano-coating includes a first high-refractive-index material layer, a first low-refractive-index material layer, a second high-refractive-index material layer and a second low-refractive-index material layer which are sequentially arranged;

wherein the first high-refractive-index material layer has a thickness between 1 nm and 60 nm, and the second high-refractive-index material layer has a thickness between 45 nm and 80 nm;

the first low-refractive-index material layer has a thickness between 1 nm and 200 nm, and the second low-refractive-index material layer has a thickness between 90 nm and 200 nm.

Further, the first transparent nano-coating includes a first high-refractive-index material layer, a first low-refractive-index material layer, a second high-refractive-index material layer, a second low-refractive-index material layer, a third high-refractive-index material layer and a third low-refractive-index material layer which are sequentially arranged;

wherein at least one from a group consisting of the first high-refractive-index material layer, the second high-refractive-index material layer and the third high-refractive-index material layer has a thickness between 45 nm and 80 nm;

at least one from a group consisting of the first low-refractive-index material layer, the second low-refractive-index material layer and the third low-refractive-index material layer has a thickness between 90 nm and 200 nm.

Further, the first transparent nano-coating includes a metal layer;

the metal layer includes at least one from a group consisting of Ti, Zr, Nb, Si, Sb, Sn, Zn, In, Al, Ni, Cr, Mg, Mn, V, W, Hf, Ta, Mo, Ga, Y, Bi, Ta, Fe and rare earth elements.

Further, the first transparent nano-coating includes a non-stoichiometric metal compound;

the non-stoichiometric metal compound includes at least one from a group consisting of Zr, Nb, Si, Sb, Sn, Zn, In, Al, Ni, Cr, Mg, Mn, V, W, Hf, Ta, Mo, Ga, Y, Bi, Ta, Fe and rare earth elements.

Further, the high-refractive-index material layer and/or the low-refractive-index material layer is provided with sublayers.

Further, the first transparent nano-coating is provided with an improving layer to improve the properties of the first transparent nano-coating.

Further, the improving layer includes at least one from a group consisting of the high-refractive-index material layer, a hydrophobic material layer and a hydrophilic material layer.

Further, the improving layer has a thickness less than or equal to 20 nm.

Further, the improving layer has a thickness less than or equal to 5 nm.

Further, at least one from a group consisting of the electrically conductive layers has a thickness less than or equal to 8 nm.

Further, the second transparent nano-coating includes a first dielectric layer, a first electrically conductive layer and a second dielectric layer which are sequentially arranged;

wherein the first dielectric layer has a thickness greater than or equal to 40 nm, and the second dielectric layer has a thickness greater than or equal to 50 nm;

the first electrically conductive layer has a thickness between 2 nm and 8 nm.

Further, the second transparent nano-coating includes a first dielectric layer, a first electrically conductive layer, a second dielectric layer, a second electrically conductive layer and a third dielectric layer which are sequentially arranged;

in which the first dielectric layer has a thickness greater than or equal to 25 nm, the second dielectric layer has a thickness greater than or equal to 60 nm, and the third dielectric layer has a thickness greater than or equal to 40 nm;

the first electrically conductive layer and/or the second electrically conductive layer has a thickness less than or equal to 8.0 nm.

Further, the second transparent nano-coating includes a first dielectric layer, a first electrically conductive layer, a second dielectric layer, a second electrically conductive layer, a third dielectric layer, a third electrically conductive layer and a fourth dielectric layer which are sequentially arranged;

wherein the first dielectric layer has a thickness greater than or equal to 25 nm, the second dielectric layer has a thickness greater than or equal to 60 nm, the third dielectric layer has a thickness greater than or equal to 50 nm, and the fourth dielectric layer has a thickness greater than or equal to 30 nm;

the first electrically conductive layer has a thickness between 5 nm and 12 nm, and the second electrically conductive layer and the third electrically conductive layer each has a thickness between 2 nm and 8 nm.

Further, the second transparent nano-coating includes a first dielectric layer, a first electrically conductive layer, a second dielectric layer, a second electrically conductive layer, a third dielectric layer, a third electrically conductive layer, a fourth dielectric layer, a fourth electrically conductive layer and a fifth dielectric layer which are sequentially arranged;

wherein the first electrically conductive layer, the second electrically conductive layer, the third electrically conductive layer and the fourth electrically conductive layer each has a thickness less than or equal to 8 nm.

Further, the second transparent nano-coating includes a first dielectric layer, a first electrically conductive layer, a second dielectric layer, a second electrically conductive layer, a third dielectric layer, a third electrically conductive layer, a fourth dielectric layer, a fourth electrically conductive layer, a fifth dielectric layer, a fifth electrically conductive layer and a sixth dielectric layer which are sequentially arranged;

in which the first electrically conductive layer, the second electrically conductive layer, the third electrically conductive layer, the fourth electrically conductive layer and the fifth electrically conductive layer each has a thickness less than or equal to 8 nm.

Further, the electrically conductive layer includes at least one from a group consisting of Ag, Ni, Cr, Cu, Fe, Mn, Pt, Ti, Zn, Sn, Al, Si and rare earth elements.

The technical solution has the advantageous effects that by adopting Ag-related materials, it is possible to further increase the directs solar reflectivity on the laminated glass, so as to further effectively improve the heat insulation effect of the laminated glass.

Further, the electrically conductive layer includes Ag or Ag alloy.

Further, the electrically conductive layer and/or the dielectric layer includes sublayers.

Further, the dielectric layer has a refractive index greater than or equal to 1.9.

Further, the dielectric layer includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements.

Further, the dielectric layer includes oxides of Zn and Sn and/or a nitride of Si.

Further, at least one from a group consisting of the dielectric layers includes Zn and Sn;

wherein an atomic ratio of Zn to Sn is between 0.4 and 0.6.

Further, the dielectric layer includes a first functional layer and a second functional layer;

the first functional layer is configured to reduce or avoid a chemical reaction of the electrically conductive layer in air and/or during heat treatment;

the second functional layer is configured to reduce or avoid a chemical reaction of the electrically conductive layer during coating.

Further, the first functional layer includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements.

Further, the second functional layer includes a compound of at least one element of Zn, Sn, Ga, Al, F, In, V, Li, K, Nb and Ti, or a mixed compound of at least one element of Zn, Sn, Ga, Al, F, In, V, Li, K, Nb and Ti.

Further, a red-green value a in visible light reflection colors of the laminated glass within an incident angle range of 0° to 60° has a numerical range of $-10 \leq a \leq 4$;

a yellow-blue value b in the visible light reflection colors of the laminated glass within the incident angle range of 0° to 60° has a numerical range of $-10 \leq b \leq 4$.

The technical solution has the advantageous effects that it is possible to meet the aesthetic requirements of the head-up display system on either the side of the inner glass plate or the side of the outer glass plate, and could meet the aesthetic requirements of the head-up display system at as many angles as possible rather than a certain angle.

Further, a red-green value a in visible light reflection colors of the laminated glass within an incident angle range of 0° to 70° has a numerical range of $-10 \leq a \leq 4$;

a yellow-blue value b in the visible light reflection colors of the laminated glass within the incident angle range of 0° to 70° has a numerical range of $-10 \leq b \leq 4$.

The technical solution has the advantageous effects that it is possible to further meet the aesthetic requirements of the head-up display system at as many angles as possible rather than a certain angle.

Further, a red-green value a in visible light reflection colors of the laminated glass within an incident angle range of 45° to 75° has a numerical range of $-10 \leq a \leq 4$;

a yellow-blue value b in the visible light reflection colors of the laminated glass within the incident angle range of 45° to 75° has a numerical range of $-10 \leq b \leq 4$.

The technical solution has the advantageous effects that considering that the mounting angles of motor vehicles such as trucks and automobiles are mainly 45° to 75°, it is more conducive to the use of the Brewster angle effect to better suppress ghosting.

Further, $-5 \leq a \leq 0$, $-5 \leq b \leq 0$.

In a second aspect, the present disclosure provides a head-up display system, including a projection system and the laminated glass.

Further, the projection system has a main wavelength equal to or above 460 nm.

The technical solution has the advantageous effects that it is possible to further reduce the harm of blue light, thereby further improving the user experiences.

As can be seen from the above technical solutions, the present disclosure provides a laminated glass and a head-up display system. The laminated glass includes an inner glass plate, an outer glass plate and an interlayer film sandwiched therebetween, a side of the inner glass plate away from the interlayer film being provided with a first transparent nano-coating for reflecting P-polarized light, and the first transparent nano-coating including at least one stacked structure composed of a high-refractive-index material layer which is sequentially deposited outwards from a surface of the inner glass plate and a low-refractive-index material layer, wherein a second transparent nano-coating attached to the interlayer film is sandwiched between the inner glass plate and the outer glass plate, the second transparent nano-coating includes dielectric layers and electrically conductive layers, and each of the electrically conductive layers is sandwiched between two of the dielectric layers; wherein the high-refractive-index material layer has a refractive index greater than or equal to 1.9, the low-refractive-index material layer has a refractive index less than or equal to 1.8, and the laminated glass has a P-polarized light reflectivity Rp greater than or equal to 16% at an incident angle of 65°. If the refractive index of the high-refractive-index material layer is less than 1.90, or the refractive index of the low-refractive-index material layer is greater than 1.80, it is difficult to obtain a high P-polarized light reflectivity and a smooth spectrum simultaneously. On the premise of ensuring the requirement on the first transparent nano-coating, using a low-refractive-index material with a greater refractive index, such as 1.7, is helpful to reduce the thickness of the low-refractive-index material layer and the production cost, and can simultaneously improve the P-polarized light reflectivity of the laminated glass and the smoothness of the P-polarized light reflection spectrum, thereby effectively increasing the brightness and the display comfort of the head-up display system using the laminated glass, and being more helpful to meet the commercialization requirement on the laminated glass and improve the use experiences of users.

BRIEF DESCRIPTION OF THE DRAWINGS

In order to more clearly explain the technical solutions in the embodiments of the present disclosure or in the prior art, the drawings to be used in the description of the embodiments or the prior art will be briefly introduced as follows. Obviously, the drawings used in the following description only illustrate some embodiments of the present disclosure, and those of ordinary skill in the art can obtain other drawings from them without paying any creative effort.

DETAILED DESCRIPTION OF THE PREFERRED EMBODIMENTS

Figure 1:
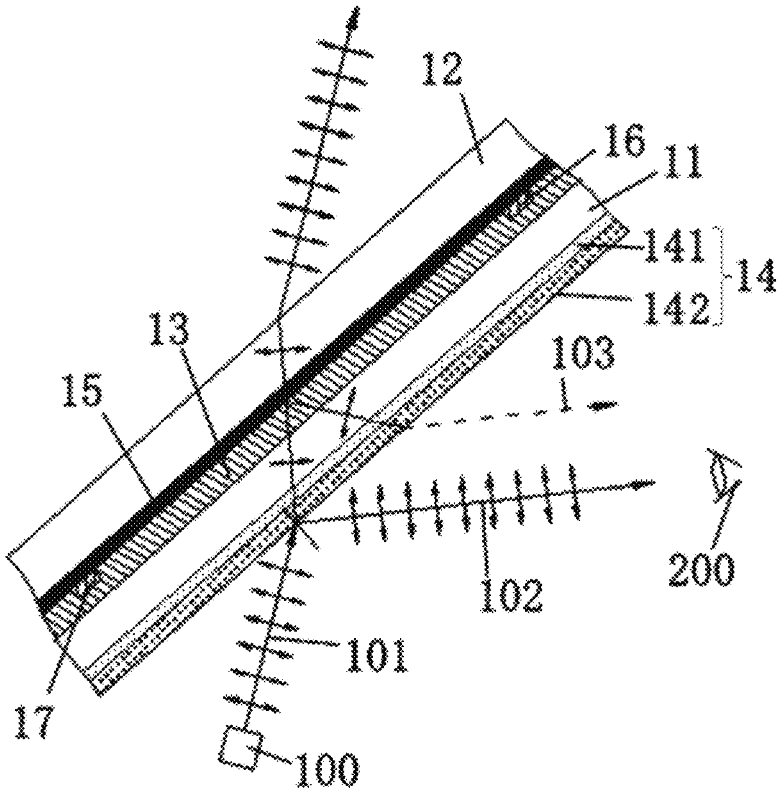
FIG. 1 illustrates a partial cross-sectional view of a first typical structure of a head-up display system according to an embodiment of the present disclosure.

In order that the objectives, technical solutions and advantages of the embodiments of the present disclosure are clearer, the technical solutions of the embodiments of the present disclosure will be clearly and completely described below in conjunction with the drawings for the embodiments of the present disclosure. Obviously, those described are part, rather than all, of the embodiments of the present disclosure. Based on the embodiments in the present disclosure, any other embodiment obtained by those of ordinary skill in the art without any creative effort should fall within the protection scope of the present disclosure.

The conventional HUD mainly uses a wedge-shaped PVB film, which has the following disadvantages: a PVB film of a special specification is required, but the price thereof is 7 to 10 times that of the ordinary PVB film and the process is difficult, resulting in the high costs of the material and process; in addition, the applicability is poor, and different types of automobiles require different PVB films.

In view of this, it is a good choice that the HUD coating is prepared by a coating method to be used in the head-up display system. The basic principle is to eliminate and suppress ghosting by utilizing the Brewster angle effect of glass. For example, it is possible to adopt a technical solution of an electrically conductive coating including at least three electrically conductive layers, or a technical solution of an electrically conductive coating including at least four electrically conductive layers. However, it is difficult to obtain a high P-polarized light reflectivity (e.g., the P-polarized light reflectivity ≥16%) simply by using a technical solution having two or more electrically conductive coatings, and the brightness of the HUD is seriously affected.

In addition, a coated HUD based on P-polarized light reflection may also be adopted. In one technical solution, there is a coating on the surface of the inner glass plate that can reflect the P-polarized light, but the high-refractive-index material used in this technical solution does not have an enough high-refractive-index such as 2.33, and it is difficult to obtain a high P-polarized light reflectivity (e.g., the P-polarized light reflectivity ≥16%).

In another technical solution, the surface of the inner glass plate is provided with a first coating reflecting the P-polarized light, and a second coating which is applied in the interior of the laminated glass includes an infrared-reflective (IR) layer. Although the P-polarized light reflectivity at 55° may be 15% or more, at this point, the visible light reflectance color has the value a of already greater than 5, showing obviously tends to be red and seriously affects the use effect of the HUD.

The simply high P-polarized light reflectivity is not enough for the HUD. In order to achieve the color-neutral displaying of the projected image as much as possible, the reflection spectrum should be as smooth as possible, without significant local minimum or maximum. In a reflection spectrum of the wavelength range from 450 nm to 650 nm, a difference between a maximum reflectivity and an average reflectivity, and a difference between a minimum reflectivity and the average reflectivity (counted based on a radiation with 100% incidence) should be at most 5%, particularly exemplarily at most 3%, and very particularly exemplarily at most 1%. In fact, the simple superposition of the first coating and the second coating cannot smooth the resultant P-polarized light reflection spectrum of the laminated glass. Even if the P-polarized light reflection spectrums of the first coating and the second coating are smooth, the resultant P-polarized light reflection spectrum of the laminated glass cannot be certainly smooth, especially in the case of a high P-polarized light reflectivity.

Meanwhile, the HUD also needs to meet the aesthetic requirement on either the side of the inner glass plate or the side of the outer glass plate. Generally, the value a of the acceptable reflection color is between −10 and 4, i.e., −10≤a≤4, and so does the value b. The value b of the reflection color is between −10 to 4, i.e., −10≤b≤4. Meanwhile, it is necessary to satisfy −10≤a≤4 and −10≤b≤4 at as many angles as possible, rather than just a certain angle. However, in the existing implementations of the laminated glass, when an incident angle is 172° and the value b is less than −12, it is obviously tends to be blue; when the incident angle is 172° and the value b is greater than 5, it is obviously yellow; when the incident angle is 55° and the value a is greater than 5, it is obviously tends to be red; when the incident angle is 172° and the value a is less than −13, it is obviously green; when the incident angle is 55° and the value b is less than −12, it is obviously tends to be blue; and when the incident angle is 55° and the value a is greater than 5, it is obviously tends to be red. Such poor appearances seriously affect the driving comfort.

In addition, the reflection colors of Rin and the reflection colors of Rout in the existing implementations of the laminated glass cannot satisfy −10≤a≤4 and −10≤b≤4 at the same time, especially the reflection color of Rin, even when the incident angle is 55° or 172°. This shows that it is not easy to obtain a beautiful coated HUD, especially in the case of a high P-polarized light reflectivity (e.g., the P-polarized light reflectivity ≥15%).

For HUDs requiring heat insulation, a direct solar reflectivity Rds (or Re) of the HUDs without using a heat insulation materials such as Ag is about 10%, which is not conducive to heat insulation.

On this basis, the embodiments of the present disclosure provide a laminated glass to solve the problems that the existing laminated glass has a low P-polarized light reflectivity and a poor smoothness of the P-polarized light reflection spectrum, the laminated glass includes an inner glass plate, an outer glass plate and an interlayer film sandwiched therebetween, wherein a side of the inner glass plate away from the interlayer film is provided with a first transparent nano-coating for reflecting P-polarized light, the first transparent nano-coating includes at least one stacked structure composed of a high-refractive-index material layer which is sequentially deposited outwards from a surface of the inner glass plate and a low-refractive-index material layer, a second transparent nano-coating attached to the interlayer film is sandwiched between the inner glass plate and the outer glass plate, the second transparent nano-coating includes dielectric layers and electrically conductive layers, and each of the electrically conductive layers is sandwiched between two of the dielectric layers, wherein the high-refractive-index material layer has a refractive index greater than or equal to 1.9, the low-refractive-index material layer has a refractive index less than or equal to 1.8, and the laminated glass has a P-polarized light reflectivity Rp greater than or equal to 16% at an incident angle of 65°. If the refractive index of the high-refractive-index material layer is less than 1.90, or the refractive index of the low-refractive-index material layer is greater than 1.80, it is difficult to obtain a high P-polarized light reflectivity and a smooth spectrum simultaneously. On the premise of ensuring the requirement on the first transparent nano-coating, using a low-refractive-index material with a greater refractive index, such as 1.7, is helpful to reduce the thickness of the low-refractive-index material layer and the production cost, and can simultaneously improve the P-polarized light reflectivity of the laminated glass and the smoothness of the P-polarized light reflection spectrum, thereby effectively increasing the brightness and the display comfort of the head-up display system using the laminated glass, and being more helpful to meet the commercialization requirement on the laminated glass and improve the use experiences of users.

The laminated glass may be used in a head-up display system, and particularly in a head-up display system used on automobile glass, and the laminated glass is specifically a head-up display front windshield which can be used in the head-up display system.

On this basis, the head-up display system provided by the present disclosure employs a coating method to prepare the HUD coating, ensuring a good HUD effect and appearance. The head-up display system at least includes:

(1) a projection system capable of projecting P-polarized light; and (2) a laminated glass capable of reflecting the P-polarized light.

In which, the laminated glass at least includes an inner glass plate and an outer glass plate, which are connected together through an interlayer of thermoplastic film (i.e., an interlayer film).

In which, the laminated glass has a P-polarized light reflectivity Rp greater than or equal to 16%.

In which, a reflection spectrum corresponding to the P-polarized light reflectivity Rp of the laminated glass has a range of less than or equal to 4.0% in the wavelength range from 460 nm to 630 nm.

In which, the inner glass plate is provided with a first transparent nano-coating, which at least includes a high-refractive-index material layer with a refractive index greater than or equal to 1.9 and a low-refractive-index material layer with a refractive index less than or equal to 1.8, and the first transparent nano-coating has a single-sided P-polarized light reflectivity R1p greater than or equal to 6%, and a P-polarized light reflection spectrum corresponding to R1p has a range named range1 in the wavelength range from 460 nm to 630 nm.

In which, the laminated glass is provided therein a second transparent nano-coating, which includes at least m electrically conductive layers and (m+1) dielectric layers (m is an integer greater than or equal to 1), and each of the electrically conductive layers is located between two of the dielectric layers. The second transparent nano-coating has a single-sided P-polarized light reflectivity R2p, and a P-polarized light reflection spectrum corresponding to the single-sided P-polarized light reflectivity R2p has a range named range2 in the wavelength range from 460 nm to 630 nm.

In which, an absolute value of (range1+range2) is less than or equal to 6%.

In one or more embodiments of the present disclosure, the refractive index refers to a refractive index when transmitted light has a wavelength of 550 nm, and the "layer" should be understood as a single layer, or the overlapping of a plurality of layers.

In one or more embodiments of the present disclosure, the thickness is a physical thickness.

In one or more embodiments of the present disclosure, Rp represents a P-polarized light reflectivity measured (according to ISO9050) from the side of the inner glass (i.e. a fourth surface) of the laminated glass at the incident angle of 65°.

Figure 2:
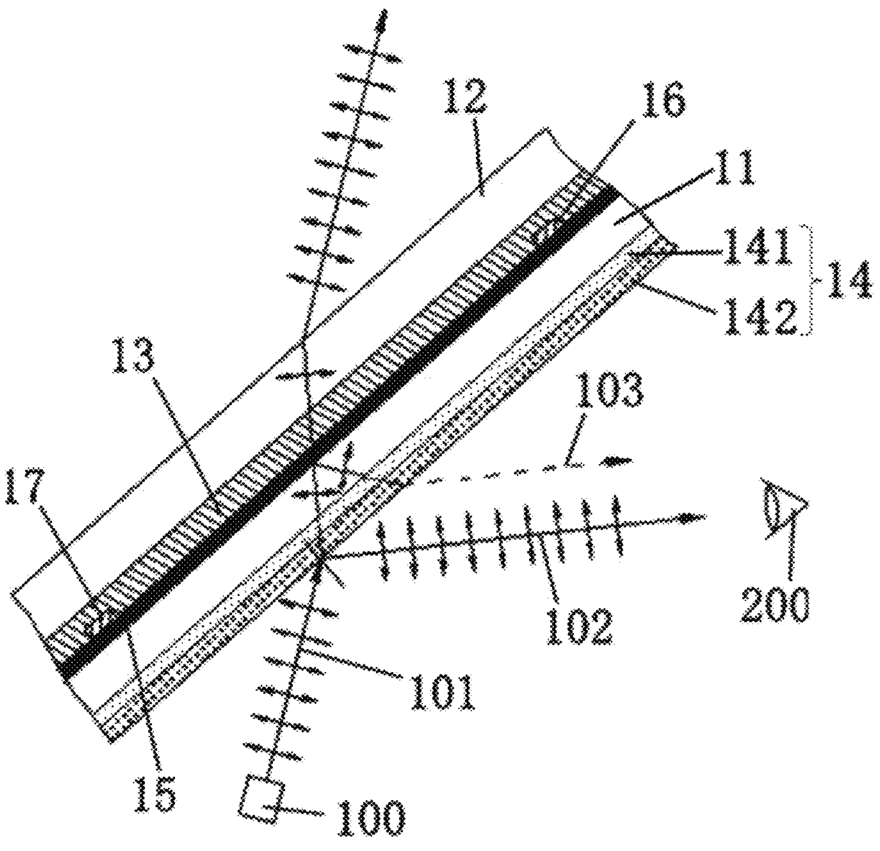
FIG. 2 illustrates a partial cross-sectional view of a second typical structure of a head-up display system according to an embodiment of the present disclosure.

In one or more embodiments of the present disclosure, R1p represents a single-sided P-polarized light reflectivity of the first transparent nano-coating at the incident angle of 65°. The measurement of the single-sided P-polarized light reflectivity R1p: (1) Sample preparation: a third second surface of the inner outer glass plate illustrated in FIG. 1 is frosted and grind off the second transparent electrically conductive film transparent nano-coating, and then blackened. If the sample is as illustrated in FIG. 2, the third surface of the inner glass plate is grit-finished and then blackened. (2) Measurement: the P-polarized light reflection spectrum is measured from the side of the inner glass plate, and R1p is calculated according to ISO9050.

In one or more embodiments of the present disclosure, R2p represents a single-sided P-polarized light reflectivity of the second transparent nano-coating at the incident angle of 65°. For the convenience of measurement, the laminated glass includes the second transparent nano-coating, but does not include the first transparent nano-coating. The measurement of R2p: (1) Sample preparation: a surface treatment such as polishing is performed on a fourth surface in FIGS. 1 and 2 so that the laminated glass only includes the second transparent nano-coating. (2) The P-polarized light reflection spectrum is measured from the fourth surface of the laminated glass, and R2p is calculated according to ISO9050.

In one or more embodiments of the present disclosure, TL represents an integrated visible light transmittance (according to ISO9050) at normal incidence, with a light source A, tested from the side of the outer glass plate.

In one or more embodiments of the present disclosure, a represents a red-green value of visible light color at a specified incident angle based on CIE1976, with a light source D65.

In one or more embodiments of the present disclosure, b represents a yellow-blue value of visible light color at a specified incident angle based on CIE1976, with a light source D65.

In one or more embodiments of the present disclosure, Rds (or Re) represents a direct solar reflectivity according to ISO9050.

Specifically, detailed explanations are given through the following embodiments and application examples.

(1) In order to solve the problems of the low P-polarized light reflectivity and the poor smoothness of the P-polarized light reflection spectrum in the existing laminated glass, the present disclosure provides an embodiment of a laminated glass, as illustrated in FIGS. 1 and 2, and the laminated glass applied in the head-up display system specifically includes:

an inner glass plate 11, an outer glass plate 12 and an interlayer film 13 sandwiched therebetween, in which a side of the inner glass plate 11 away from the interlayer film 13 is provided with a first transparent nano-coating 14 for reflecting P-polarized light, the first transparent nano-coating 14 includes at least one stacked structure composed of a high-refractive-index material layer 141 which is sequentially deposited outwards from a surface of the inner glass plate 11 and a low-refractive-index material layer 142, a second transparent nano-coating 15 attached to the interlayer film 13 is sandwiched between the inner glass plate 11 and the outer glass plate 12, the second transparent nano-coating 15 includes dielectric layers and electrically conductive layers, and each of the electrically conductive layers is sandwiched between two of the dielectric layers;

In which the high-refractive-index material layer 141 has a refractive index greater than or equal to 1.9, the low-refractive-index material layer 142 has a refractive index less than or equal to 1.8, and the laminated glass has a P-polarized light reflectivity Rp greater than or equal to 16% at an incident angle of 65°.

As illustrated in FIGS. 1 and 2, the head-up display system of the present disclosure at least includes a laminated glass 1 and a projection system 100, in which the laminated glass 1 at least includes an inner glass plate 11, an outer glass plate 12, an interlayer film 13 sandwiched between the inner glass plate 11 and the outer glass plate 12, a first transparent electrically conductive film transparent nano-coating on the inner glass plate 11, and a second transparent electrically conductive film transparent nano-coating sandwiched between the inner glass plate 11 and the outer glass plate 12. In the present disclosure, a surface of the outer glass plate 12 farthest from the interlayer film, i.e., an outer glass plate-air interface, is defined as a first surface, a surface of the outer glass plate 12 closest to the interlayer film, i.e., an outer glass plate-interlayer film interface, is defined as a second surface, a surface of the inner glass plate 11 closest to the interlayer film, i.e., an inner glass plate-interlayer film air interface, is defined as a third surface, and a surface of the inner glass plate 11 farthest from the interlayer film, i.e., an inner glass plate-air interface, is defined as a fourth surface. In FIGS. 1 and 2, a first transparent nano-coating 14 is deposited on the fourth surface, FIG. 1 illustrates that a second transparent nano-coating 15 is deposited on the second surface, and FIG. 2 illustrates that a second transparent nano-coating 15 is deposited on the third surface. A distance H is available from the second transparent nano-coating to the first transparent nano-coating.

In FIGS. 1 and 2, a P-polarized light 101 generated by the projection system 100 is incident on the first transparent nano-coating 14 at a specific incident angle, and a first reflected light 102 generated by the reflection of a part of the P-polarized light 101 by the transparent nano-coating 14 forms a head-up display image named Image1 visible to a human eye 200; the other part of the P-polarized light propagates in the laminated glass through the transparent nano-coating 14, and when reaching the second transparent nano-coating 15 on the second surface or the second transparent nano-coating 15 on the third surface, a part of the P-polarized light propagating in the laminated glass is reflected and then refracted from the fourth surface to generate a first refracted light 103, thereby forming a head-up display image named Image2. In which, Image1 is generated by the first transparent nano-coating and serves as a main image, and Image2 is generated by the second transparent nano-coating and serves as a main image or an auxiliary image. When Image2 serves as the main image, the single-sided P-polarized light reflectivity R2p of the second transparent nano-coating 15 is set to be greater than or equal to 2%, such as 3%, 5%, 8%, etc., which may be achieved using ultra-thin glass or a wedge-shaped middle film. For example, the distance H from the second transparent nano-coating to the first transparent nano-coating, including the thicknesses of the first transparent nano-coating and the second transparent nano-coating, is less than or equal to 1.8 mm, such as H≤1.6 mm, H≤1.2 mm, H≤0.8 mm or H≤0.3 mm. Another example is to use a wedge-shaped interlayer film with a wedge angle of 0.3 to 0.8 mrad. When R1p/RP≥0.9, the single-sided P-polarized light reflectivity R2p of the second transparent nano-coating 15 is set to be less than 2%. At this time, the brightness ratio of Image1 and Image2 is large enough that the image of Image2 can hardly be seen, and then the ultra-thin glass or the wedge-shaped interlayer film may not be used.

In order to obtain a high-brightness HUD image, the P-polarized light reflectivity Rp of the laminated glass of the present disclosure is greater than or equal to 16%, exemplarily greater than or equal to 20%, which is helpful to meet the commercialization requirement. Therefore, the P-polarized light reflectivity R1p of the first transparent nano-coating is greater than or equal to 6%, otherwise, it is not conducive to obtaining a high P-polarized light reflectivity. In addition, as the P-polarized light reflectivity R1p of the first transparent nano-coating increases, it is more conducive to improving the ratio R1p/Rp, thereby increasing the design freedom of the second transparent nano-coating without depending on the wedge-shaped interlayer film and/or lowering the requirement on the second transparent nano-coating, so it is favored that R1p≥10%, and more favored that R1p≥15%.

The first transparent nano-coating includes at least one high-refractive-index material layer 141 with a refractive index greater than or equal to 1.90, and at least one low-refractive-index material layer 142 with a refractive index less than or equal to 1.80. By matching the high-refractive-index material layer 141 with the low-refractive-index material layer 142, the requirements on the first transparent nano-coating can be realized. If the refractive index of the high-refractive-index material layer 141 is less than 1.90, or the refractive index of the low-refractive-index material layer 142 is greater than 1.80, it is difficult to simultaneously obtain a high P-polarized light reflectivity and a smooth spectrum. On the premise of ensuring the requirement on the first transparent nano-coating, using a low-refractive-index material with a greater refractive index, such as 1.7, is helpful to reduce the thickness of the low-refractive-index material layer 142 and the production cost.

In an embodiment of the present disclosure, the first transparent nano-coating at least includes one high-refractive-index material layer 141 with a refractive index greater than or equal to 2.4 and one low-refractive-index material layer 142 with a refractive index less than or equal to 1.6. By matching the high-refractive-index material layer 141 with the low-refractive-index material layer 142, the requirement on the first transparent nano-coating can be realized, while it is helpful to improve the appearance of the HUD.

In an embodiment of the present disclosure, at least one of the high-refractive-index material layers 141 has a thickness greater than or equal to 45 nm and a refractive index greater than or equal to 2.4, that is, the first transparent nano-coating at least includes one high-refractive-index material layer 141 with a thickness greater than or equal to 45 nm and a refractive index greater than or equal to 2.4, which is helpful to obtain a high smoothness of the spectrum of the P-polarized light and improve the appearance of the HUD.

(2) Based on the solution of the problems that the existing laminated glass has a low P-polarized light reflectivity and a poor smoothness of the P-polarized light reflection spectrum, in order to further solve the problems that the existing laminated glass affects the color developing effect and the P-polarized light reflection spectrum is not smooth enough, the present disclosure provides an embodiment of a laminated glass. In order to realize the color-neutral displaying of the HUD images as much as possible, the reflection spectrum curve should be as smooth as possible without significant local minimum or maximum. Although the prior art requires a reflection spectrum of the wavelength range of 450 nm to 650 nm, it is enough for the HUD that the reflection spectrum curve is smooth in a wavelength range from 460 nm to 630 nm, because the wavelength range from 460 nm to 630 nm already includes the wavelengths of red, green and blue, which is beneficial to the selection of the film system and the film layer material.

In the present disclosure, in order to enable the P-polarized light reflection spectrum corresponding to the Rp to be smooth, at least in the wavelength range from 460 nm to 630 nm, measured from the side of the inner glass plate of the laminated glass, a P-polarized light reflection spectrum corresponding to the P-polarized light reflection reflectivity (counted based on a radiation with 100% incidence) has a range less than or equal to 4%, and exemplarily less than or equal to 2%, so as to meet the commercialization requirement.

For the convenience of explanation, it is specified in the present disclosure that the P-polarized light reflection spectrum corresponding to R1p has a range named range1 in the wavelength range from 460 nm to 630 nm, and the P-polarized light reflection spectrum corresponding to R2p has a range named range2 in the wavelength range from 460 nm to 630 nm. When a wavelength of a maximum spectral reflectivity corresponding to range1 is in the wavelength range of blue light, i.e., between 460 nm and 480 nm, range1 is a positive value; on the contrary, when a wavelength of the maximum spectral reflectivity corresponding to range1 is not in the wavelength range of blue light, range1 is a negative value. When a wavelength of a maximum spectral reflectivity corresponding to range2 is in the wavelength range of blue light, i.e., between 460 nm and 480 nm, range2 is a positive value; on the contrary, when a wavelength of the maximum spectral reflectivity corresponding to range2 is not in the wavelength range of blue light, range2 is a negative value. For example, when a wavelength of the maximum value of the reflection spectrum corresponding to R1p is in the wavelength range of blue light and the range is 3%, range1 is 3%; For another example, when a wavelength of the maximum value of the reflection spectrum corresponding to R1p is not in the wavelength range of blue light and the range is 3%, range1 is −3%. Except that range1 and range2 may be negative values, other ranges in the present disclosure are all positive values.

In order to realize the smooth of P-polarized light reflection spectrum corresponding to Rp, the applicant finds that when the absolute value of the sum of range1 and range2 is less than or equal to 6%, that is, the absolute value of (range1+range2) is less than or equal to 6%, it is easy to obtain a smooth P-polarized light reflection spectrum of the laminated glass, and more exemplarily, the absolute value of (range1+range2) is less than or equal to 3%, which is helpful to smooth the P-polarized light reflection spectrum of the laminated glass in the wavelength range from 460 nm to 630 nm even if the wavelengths corresponding to maximum and minimum values of the P-polarized light spectral reflectivity of the first transparent nano-coating are completely consistent with those corresponding to maximum and minimum values of the P-polarized light spectral reflectivity of the second transparent nano-coating respectively. Optionally, when range1 and range2 are both positive or negative, the absolute value of (range1+range2) is less than or equal to 6%, and exemplarily less than or equal to 3%. Optionally, when one of range1 and range2 is positive and the other is negative, the absolute value of (range1+range2) is less than or equal to 6%, and exemplarily less than or equal to 3%.

In order to realize the smooth of P-polarized light reflection spectrum corresponding to Rp, the range of the P-polarized light reflection spectrum corresponding to R1p in the wavelength range from 460 nm to 630 nm is less than or equal to 12.0%, and exemplarily less than or equal to 5%, that is, the absolute value of range1 is less than or equal to 12.0%, exemplarily less than or equal to 5%, and more exemplarily less than or equal to 2%. If the range of the P-polarized light reflection spectrum corresponding to R1p is greater than 12.0% in the wavelength range from 460 nm to 630 nm, it is difficult to smooth the P-polarized light reflection spectrum corresponding to Rp and/or the appearance of the laminated glass will be affected.

In order to realize the smooth of P-polarized light reflection spectrum corresponding to Rp, the range of the P-polarized light reflection spectrum corresponding to R2p in the wavelength range from 460 nm to 630 nm is less than or equal to 8.0%, exemplarily less than or equal to 5%, and more exemplarily less than or equal to 2%, that is, the absolute value of range2 is less than or equal to 8.0%, exemplarily less than or equal to 5%, and more exemplarily less than or equal to 2%. If the range of the P-polarized light reflection spectrum corresponding to R2p is greater than 8.0% in the wavelength range from 460 nm to 630 nm, it is difficult to smooth the P-polarized light reflection spectrum corresponding to Rp.

(3) Based on the solution of the problems that the existing laminated glass has a low P-polarized light reflectivity and a poor smoothness of the P-polarized light reflection spectrum, in order to further solve the problem that the existing laminated glass has a poor heat insulation effect, the present disclosure provides an embodiment of the laminated glass. Since the second transparent nano-coating of the present disclosure includes the electrically conductive layers, a heat insulation function is available, and the direct solar reflectivity Rds is greater than or equal to 20%, exemplarily greater than or equal to 25%, and more exemplarily greater than or equal to 30%, so as to effectively improve the direct solar reflectivity on the laminated glass and the heat insulation effect of the laminated glass, thereby effectively improving the heat insulation effect of the head-up display system using the laminated glass, and being more helpful to meet the commercialization requirement and improving the use experiences of users.

In addition, the second transparent nano-coating includes the electrically conductive layers, which is suitable for electric heating and capable of quick dehumidifying, defogging and even deicing. Therefore, the laminated glass of the present disclosure can also have an electric heating function, and is very suitable for power sources of 8 V to 48 V. When being provided with busbars, the second transparent nano-coating may be connected to an electrode of a power source to introduce current into the second transparent nano-coating over as large a portion of the glass plate width as possible.

In an embodiment of the present disclosure, the high-refractive-index material layer 141 includes a first compound containing at least one from a group consisting of Ti, Zr, Nb, Si, Sb, Sn, Zn, In, Al, Ni, Cr, Mg, Mn, V, W, Hf, Ta, Mo, Ga, Y, Bi, Ta, rare earth elements, etc., exemplarily, an acid and alkali resistant compound, including, but not limited to, SiN, ZnSnOx, ZnSnMgOx, TiOx, SiZlN, ZrN, etc.

In an embodiment of the present disclosure, the high-refractive-index material layer 141 is made of at least one selected from a group consisting of an oxide of Ti, an oxynitride of Ti, a nitride of Ti, and a Ti metal. Optionally, the oxide of Ti may include one or more a first metal element and compounds thereof, and the first metal element includes, but is not limited to, Zr, Nb, Si, Sb, Sn, Zn, In, Al, Ni, Cr, Mg, Mn, V, W, Hf, Ta, Mo, Ga, Y, Bi, Ta and rare earth elements. For example, the oxide of Ti includes one or more of $ZrO_2$, $WO_3$, $MoO_2$ and $Y_2O_3$. Of course, the oxide of Ti may also include one or more of ZrN and SiN as required. Exemplarily, a mass percentage of the first metal element in the oxide of Ti is less than or equal to 40%. For example, if the oxide of Ti includes an oxide of Si, the mass of the oxide of Si/(the mass of the oxide of Si+the mass of the oxide of Ti) is less than or equal to 40%. For example, if the oxide of Ti includes an oxide of Sn and an oxide of Zr, (the mass of the oxide of Sn+the mass of the oxide of Zr)/(the mass of the oxide of Sn+the mass of the oxide of Zr+the mass of the oxide of Ti) is less than or equal to 40%. If the mass percentage of the first metal element exceeds 40%, it is not easy to obtain a high refractive material with a refractive index greater than or equal to 2.4, so the mass percentage of the first metal element does not exceed 20%, more exemplarily does not exceed 10%, and most exemplarily does not exceed 5%. Optionally, the oxynitride of Ti may include one or more a second metal element and compounds thereof, and the second metal element includes but is not limited to Zr, Nb, Si, Sb, Sn, Zn, In, Al, Ni, Cr, Mg, Mn, V, W, Hf, Ta, Mo, Ga, Y, Bi, Ta, and rare earth elements. For example, the oxynitride of Ti includes one or more of $ZrO_2$, $Bi_2O_3$, $HfO_2$, $MoO_2$ and $Y_2O_3$. Of course, the oxynitride of Ti may also include one or more of ZrN and SiN as required. In an embodiment of the present disclosure, a mass percentage of the second metal element in the oxynitride of Ti is less than or equal to 40%. For example, if the oxynitride of Ti includes an oxide of Zr, the mass of the oxide of Zr/(the mass of the oxide of Zr+the mass of the Ti oxide) is less than or equal to 40%. For example, if the oxynitride of Ti includes an oxide of Zn and a nitride of Zr, (the mass of the oxide of Zn+the mass of the nitride of Zr)/(the mass of the oxide of Zn+the mass of the nitride of Zr+the mass of the oxynitride of Ti) is less than or equal to 40%. If the mass percentage of the second metal element exceeds 40%, it is not easy to obtain a high refractive material with a refractive index greater than or equal to 2.4, so the mass percentage of the second metal element does not exceed 20%, more exemplarily does not exceed 10%, and most exemplarily does not exceed 5%.

In an embodiment of the present disclosure, the low-refractive-index material layer 142 is made of at least one selected from a group consisting of an oxide of Si, an oxynitride of Si, a carbon oxide of Si, an oxide of Al and a mixture thereof, such as a mixture of $SiO_2$ and SiOxNy, SiAlOx, porous $Al_2O_3$, porous $SiO_2$, etc. Optionally, the oxide of Si, the oxynitride of Si, and the carbon oxide of Si may include one or more a third metal element and compounds thereof, and the third metal element includes but is not limited to Zr, Nb, Ti, Sb, Sn, Zn, In, Ni, Cr, Mg, Mn, V, W, Hf, Ta, Mo, Ga, Y, Bi, Ta and rare earth elements. For example, the oxide of Si includes one or more of $ZrO_2$, SiN, $MoO_2$ and $Y_2O_3$. In an embodiment of the present disclosure, a mass percentage of the third metal element in the oxide of Si is less than or equal to 30%. For example, if the oxide of Si includes MgO, the mass of MgO/(the mass of the oxide of Si+the mass of MgO) is less than or equal to 40%. If the mass percentage of the third metal element exceeds 30%, it is not easy to obtain a low refractive material with a refractive index less than or equal to 1.6, so the mass percentage of the third metal element does not exceed 30%, and more exemplarily does not exceed 10%.

In which, the first transparent nano-coating 14 may be a two-layered, four-layered or six-layered structure.

In an embodiment of the present disclosure, the high-refractive-index material layer 141 and the low-refractive-index material layer 142 may be sequentially deposited on the fourth surface of the inner glass plate 11.

Optionally, the first transparent nano-coating 14 includes one high-refractive-index material layer 141 and one low-refractive-index material layer 142, thereby forming a structure of the inner glass plate 11/the high-refractive-index material layer (abbreviated as H11)/the low-refractive-index material layer (abbreviated as L11), such as the inner glass plate 11/TiOx/$SiO_2$, or the inner glass plate 11/TiOx/the porous $Al_2O_3$. Exemplarily, the thickness of the high-refractive-index material layer H11 is between 45 nm and 120 nm, otherwise the spectral smoothness and/or the appearance of the HUD will be affected. Exemplarily, the thickness of the low-refractive-index material layer L11 is between 90 nm and 200 nm, otherwise the spectral smoothness and/or the appearance of the HUD will be affected.

Optionally, the first transparent nano-coating 14 includes two high-refractive-index material layers and two low-refractive-index material layers, thereby forming a structure of the inner glass plate 11/the high-refractive-index material layer (abbreviated as H22)/the low-refractive-index material layer (abbreviated as L22)/the high-refractive-index material layer (abbreviated as H21)/the low-refractive-index material layer (abbreviated as L21), such as the inner glass plate 11/TiOx/$SiO_2$/TiOx/$SiO_2$, or the inner glass plate 11/TiOx/$SiO_2$/TiOxNy/SiAlOx. Exemplarily, the thickness of the high-refractive-index material layer H21 is between 45 nm and 80 nm. Exemplarily, the thickness of the high-refractive-index material layer H22 is between 1 nm and 60 nm.

Exemplarily, the thickness of the low-refractive-index material layer L21 is between 90 nm and 200 nm. Exemplarily, the thickness of the low-refractive-index material layer L22 is between 1 nm and 200 nm. Otherwise, the spectral smoothness and/or the appearance of the HUD will be affected.

Optionally, the first transparent nano-coating 14 includes three high-refractive-index material layers and three low-refractive-index material layers, thereby forming a structure of the inner glass plate 11/the high-refractive-index material layer (abbreviated as H33)/the low-refractive-index material layer (abbreviated as L33)/the high-refractive-index material layer (abbreviated as H32)/the low-refractive-index material layer (abbreviated as L32)/the high-refractive-index material layer (abbreviated as H31)/the low-refractive-index material layer (abbreviated as L31), such as the inner glass plate the inner glass 11/TiOx/$SiO_2$/TiOx/$SiO_2$/TiOx/TiOxNy/SiAlOx/, or plate 11/TiOxNy/$SiO_2$/TiOxNy/$SiO_2$/TiOx/TiOxNy/SiAlOx/.

Exemplarily, at least one of the high-refractive-index material layers H31, H32 and H33 has a thickness between 45 nm and 80 nm. Exemplarily, at least one of the low-refractive-index material layers L31, L32 and L33 has a thickness between 90 nm and 200 nm.

In an embodiment of the present disclosure, the first transparent nano-coating includes a metal layer, which is made of at least one selected from a group consisting of Ti, Zr, Nb, Si, Sb, Sn, Zn, In, Al, Ni, Cr, Mg, Mn, V, W, Hf, Ta, Mo, Ga, Y, Bi, Ta, Fe and rare earth elements, and exemplarily metal elements or alloys resistant to oxidation and acid and alkali corrosion, including but not limited to Ni, Cr, stainless steel, NiCr, Ti, etc.

In an embodiment of the present disclosure, the first transparent nano-coating includes a non-stoichiometric metal compound, which is made of at least one selected from a group consisting of Zr, Nb, Si, Sb, Sn, Zn, In, Al, Ni, Cr, Mg, Mn, V, W, Hf, Ta, Mo, Ga, Y, Bi, Ta, Fe and rare earth elements, and exemplarily a non-stoichiometric compound made of of metal elements or alloys resistant to oxidation and acid and alkali corrosion, including but not limited to NiOx ($x<1$), CrOx ($x<1$), NiCrNx ($x<1$), SiOx ($x<1.2$) and so on.

In which, the first transparent nano-coating 14 may be provided with sublayers.

In an embodiment of the present disclosure, the high-refractive-index material layer may include sublayers, such as TiOx/TiOxNy, or TiOx/TiZrOx, and for example, a plurality of layers of TiOx with different refractive indices, such as SiN/TiOx/ZnSnOx, may be obtained with the variation of x in TiOx.

In an embodiment of the present disclosure, the low-refractive-index material layer may include sublayers, such as $SiO_2$/porous $SiO_2$, or $SiO_2$/SiAlOx.

In which, the first transparent nano-coating 14 may be provided with an improving layer.

In an embodiment of the present disclosure, the first transparent nano-coating 14 includes an improving layer, which is on the outermost side of the first transparent nano-coating 14 and can achieve one or more of the following effects:

(1) improving the acid resistance of the first transparent nano-coating 14;
(2) improving the alkali resistance of the first transparent nano-coating 14;
(3) improve the color of the HUD;
(4) improving the wear resistance of the first transparent nano-coating 14; and
(5) changing a contact angle of the first transparent nano-coating 14.

Optionally, the improving layer is made of the high-refractive-index material, such as TiOx, TiOxNy, SiN, and ZnSnOx. In an embodiment of the present disclosure, the improving layer has a thickness less than or equal to 20 nm, exemplarily less than 10 nm, and more exemplarily less than or equal to 5 nm.

Optionally, the improving layer is a hydrophobic material layer, and exemplarily, the hydrophobic material layer has a contact angle greater than or equal to 100°.

Optionally, the improving layer is a hydrophilic material layer, and exemplarily, the hydrophilic material layer has a contact angle less than or equal to 20°.

In which, the second transparent nano-coating 15 may be provided with a Low-e (low-emissivity) layer.

The second transparent nano-coating includes at least m electrically conductive layers and (m+1) dielectric layers (m is an integer greater than or equal to 1), and each of the electrically conductive layers is located between two of the dielectric layers.

In an embodiment of the present disclosure, the second transparent nano-coating 15 includes at least one electrically conductive layer with a thickness less than or equal to 8.0 nm, and each of the electrically conductive layers is arranged between two of the dielectric layers or layer sequences. If each of the electrically conductive layers has a thickness greater than 8.0 nm, the appearance of the HUD and/or the P-polarized light reflectivity and/or the smoothness of the P-polarized light spectrum may be affected.

In which, the second transparent nano-coating 15 may be provided with a single-silver structure.

Optionally, the second transparent nano-coating 15 includes one electrically conductive layer and two dielectric layers, thereby forming a structure of a first dielectric layer/a first electrically conductive layer/a second dielectric layer, specifically as illustrated in FIG. 1, a structure of the outer glass plate 12/the first dielectric layer/the first electrically conductive layer/the second dielectric layer, and specifically as illustrated in FIG. 2, a structure of the inner glass plate 11/the first dielectric layer/the first electrically conductive layer/the second dielectric layer. Exemplarily, the first dielectric layer has a thickness greater than or equal to 40 nm, the second dielectric layer has a thickness greater than or equal to 50 nm, and the first electrically conductive layer has a thickness greater than or equal to 2 nm and less than or equal to 8.0 nm, otherwise, it may cause issues with the appearance of the HUD and/or the P-polarized light reflectivity and/or the smoothness of the P-polarized light spectrum.

In which, the second transparent nano-coating 15 may be provided with a double-silver structure.

Optionally, the second transparent nano-coating 15 includes two electrically conductive layers and three dielectric layers, thereby forming a structure of a first dielectric layer/a first electrically conductive layer/a second dielectric layer/a second electrically conductive layer/a third dielectric layer, specifically as illustrated in FIG. 1, a structure of the outer glass plate 12/the first dielectric layer/the first electrically conductive layer/the second dielectric layer/the second electrically conductive layer/the third dielectric layer, and specifically as illustrated in FIG. 2, a structure of the inner glass plate 11/the first dielectric layer/the first electrically conductive layer/the second dielectric layer/second electrically conductive layer/the third dielectric layer. Optionally, the first electrically conductive layer and/or the second electrically conductive layer has a thickness less than or equal to 8.0 nm, otherwise, the appearance of the HUD and/or the P-polarized light reflectivity and/or the smoothness of the P-polarized light spectrum will be affected. Exemplarily, the first dielectric layer has a thickness greater than or equal to 25 nm, the second dielectric layer has a thickness greater than or equal to 60 nm, and the third dielectric layer has a thickness greater than or equal to 40 nm. At least one of the first electrically conductive layer and the second electrically conductive layer has a thickness less than or equal to 8.0 nm. Exemplarily, the first electrically conductive layer has a thickness greater than or equal to 4 nm and less than or equal to 8.0 nm, and the second electrically conductive layer has a thickness greater than or equal to 4 nm and less than or equal to 8.0 nm, which helps to decrease the display brightness of Image2, thereby reducing the dependence of the HUD on the glass thickness.

In which, the second transparent nano-coating 15 may be provided with a three-silver structure.

Optionally, the second transparent nano-coating 15 includes three electrically conductive layers and four dielectric layers, thereby forming a structure of a first dielectric layer/a first electrically conductive layer/a second dielectric layer/a second electrically conductive layer/a third dielectric layer/third electrically conductive layer/a fourth dielectric layer structure, specifically as illustrated in FIG. 1, a structure of the outer glass plate 12/the first dielectric layer/the first electrically conductive layer/the second dielectric layer/the second electrically conductive layer/the third dielectric layer/third electrically conductive layer/the fourth dielectric layer, and specifically as illustrated in FIG. 2, a structure of the inner glass plate 11/the first dielectric layer/the first electrically conductive layer/the second dielectric layer/the third dielectric layer/the third electrically conductive layer/the fourth dielectric layer. Exemplarily, the first dielectric layer has a thickness greater than or equal to 25 nm, the second dielectric layer has a thickness greater than or equal to 60 nm, the third dielectric layer has a thickness greater than or equal to 50 nm, the fourth dielectric layer has a thickness greater than or equal to 30 nm, the first electrically conductive layer has a thickness greater than or equal to 5 nm and less than or equal to 12 nm, the second electrically conductive layer has a thickness greater than or equal to 2 nm and less than or equal to 8.0 nm, and the third electrically conductive layer has a thickness greater than or equal to 2 nm and less than or equal to 8.0 nm.

In which, the second transparent nano-coating 15 may be provided with a four-silver structure.

Optionally, the second transparent nano-coating 15 includes four electrically conductive layers and five dielectric layers, thereby forming a structure of a first dielectric layer/a first electrically conductive layer/a second dielectric layer/a second electrically conductive layer/a third dielectric layer/a third electrically conductive layer/a fourth dielectric layer/a fourth electrically conductive layer/a fifth dielectric layer, specifically as illustrated in FIG. 1, a structure of the outer glass plate 12/the first dielectric layer/the first electrically conductive layer/the second dielectric layer/the second electrically conductive layer/the third dielectric layer/the third electrically conductive layer/the fourth dielectric layer/the fifth dielectric layer, and specifically as illustrated in FIG. 2, a structure of the inner glass plate 11/the first dielectric layer/the first electrically conductive layer/the second dielectric layer/the third dielectric layer/the third electrically conductive layer. Exemplarily, the first electrically conductive layer, the second electrically conductive layer, the third electrically conductive layer and the fourth electrically conductive layer each has a thickness less than or equal to 8.0 nm.

In which, the second transparent nano-coating 15 may be provided with a five-silver structure.

Optionally, the second transparent nano-coating 15 includes five electrically conductive layers and six dielectric layers, thereby forming a structure of a first dielectric layer/a first electrically conductive layer/a second dielectric layer/a second electrically conductive layer/a third dielectric layer/a third electrically conductive layer/a fourth dielectric layer/a fourth electrically conductive layer/a fifth dielectric layer/a fifth electrically conductive layer/a sixth dielectric layer, specifically as illustrated in FIG. 1, a structure of the outer glass plate 12/the first dielectric layer/the first electrically conductive layer/the second dielectric layer/the second electrically conductive layer/the third dielectric layer/the third electrically conductive layer/the fourth dielectric layer/the fourth electrically conductive layer/the fifth dielectric layer/the fifth electrically conductive layer/the sixth dielectric layer, an specifically as illustrated in FIG. 2, a structure of the inner glass plate 11/the first dielectric layer/the first electrically conductive layer/the second dielectric layer/the second electrically conductive layer/the third dielectric layer/the third electrically conductive layer/the fourth dielectric layer/the fourth electrically conductive layer/the fifth dielectric layer/the fifth electrically conductive layer/the sixth dielectric layer. Exemplarily, the first electrically conductive layer, the second electrically conductive layer, the third electrically conductive layer, the fourth electrically conductive layer and the fifth electrically conductive layer each has a thickness less than or equal to 8.0 nm.

In an embodiment of the present disclosure, the electrically conductive layer of the present disclosure includes at least one from a group consisting of Ag, Ni, Cr, Cu, Fe, Mn, Pt, Ti, Zn, Sn, Al, Si and rare earth element, and exemplarily Ag or Ag alloy.

In an embodiment of the present disclosure, the electrically conductive layer of the present disclosure may include sublayers, and for example may be Ag/Cu/Ag, AgNi/Cr, Ag/AgCu/, NiCr/Ag/NiCr, etc.

In an embodiment of the present disclosure, the dielectric layer has a refractive index greater than or equal to 1.9, and if the refractive index is lower than 1.9, it is difficult to obtain an ideal optical appearance.

In an embodiment of the present disclosure, the dielectric layer includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth element, and exemplarily at least includes oxides of Zn and Sn and/or at least includes a nitride of Si.

Optionally, there is one dielectric layer, exemplarily including at least Zn and Sn, wherein an atomic ratio of Zn to Sn is between 0.4 and 0.6. For example, a ZnSnOx film may be prepared by sputtering using a ZnSnOx ceramic target. For example, the ZnSnMgOx film may be prepared by sputtering using a ZnSnMgOx ceramic target.

Optionally, the dielectric layer may include sublayers, such as ZnSnOx/SiN/ZnSnOx, ZnO/ZnSnNiOx, AZO/SiN/AZO, etc.

Optionally, the dielectric layer at least includes two functional layers, i.e., a first functional layer and a second functional layer.

Optionally, the first functional layer can protect the electrically conductive layer and reduce or avoid the chemical reaction of the electrically conductive layer in air and/or during heat treatment. The first functional layer includes at least one from a group consisting of Zr, Nb, Si, Sb, Sn, Zn, In, Al, Ni, Cr, Mg, Mn, V, W, Hf, Ta, Mo, Ga, Y, Bi, Ta and rare earth elements, and exemplarily at least includes oxides of Zn and of Sn and/or at least includes an oxide of Si.

Optionally, the second functional layer can reduce or avoid the chemical reaction of the electrically conductive layer during coating. The material of the second functional layer is selected from compounds or mixed compounds of Zn, Sn, Ga, Al, F, In, V, Li, K, Nb and Ti, and exemplarily a Zn-based oxide or Zn-based oxide doping.

(4) Based on the solution of the problems that the existing laminated glass has a low P-polarized light reflectivity and a poor smoothness of the P-polarized light reflection spectrum, in order to further solve the problem that the existing laminated glass cannot guarantee the appearance comfort from multiple angles, the present disclosure provides an embodiment of the laminated glass, wherein a red-green value a in visible light reflections color of the laminated glass has a numerical range of $-10 \leq A \leq 4$; and a yellow-blue value b in the visible light reflection colors of the laminated glass has a numerical range of $-10 \leq b \leq 4$.

Specifically, the HUD should also meet the aesthetic requirements either on the side of the inner glass plate or the side of the outer glass plate. Generally, the acceptable reflection color has the value a between −10 and 4, i.e., $-10 \leq a \leq 4$, and so does the value b. The reflection color has the value b between −10 and 4, i.e., $-10 \leq b \leq 4$; meanwhile, it is necessary to satisfy $-10 \leq a \leq 4$ and $-10 \leq b \leq 4$ at as many angles as possible, not just a certain angle.

In an embodiment of the present disclosure, in an incident angle range of at least 0° to 60°, the value a and the value b of the reflection color of the laminated glass 1 meet $-10 \leq a \leq 4$, and $-10 \leq b \leq 4$, exemplarily $-10 \leq a \leq 0$ and $-10 \leq b \leq 0$, and more exemplarily $-5 \leq a \leq 0$ and $-5 \leq b \leq 0$.

In an embodiment of the present disclosure, in an incident angle range of at least 0° to 70°, the value a and the value b of the reflection color of the laminated glass 1 meet $-10 \leq a \leq 4$ and $-10 \leq b \leq 4$, exemplarily $-10 \leq a \leq 0$ and $-10 \leq b \leq 0$, and more exemplarily $-5 \leq a \leq 0$ and $-5 \leq b \leq 0$. This can be achieved by the first transparent nano-coating and the second transparent nano-coating.

Considering that the mounting angles of motor vehicles such as trucks and automobiles are mainly 45° to 75°, the incident angle θB of the present disclosure may be any angle or angle range from 45° to 75°, including but not limited to 45° to 70°, 50° to 68°, 60° to 72°, etc. The incident angle is exemplarily 50° to 70°, which is more conducive to the use of the Brewster angle effect and to better suppress ghosting.

(5) Based on the above embodiments of the laminated glass, the present disclosure further provides a head-up display system including the laminated glass, which can solve the problems that the existing laminated glass has a low P-polarized light reflectivity and a poor smoothness of the P-polarized light reflection spectrum, the existing laminated glass affects the color developing effect, the P-polarized light reflection spectrum is not smooth enough, the existing laminated glass has a poor heat insulation effect, and the existing laminated glass cannot guarantee the appearance comfort from multiple angles. The present disclosure adopts the P-polarized light projection imaging technology, and the projection system 100 can project both the P-polarized light 11 and non-P-polarized light, and it is more favorable to suppress ghosting as the P-polarized light radiation component increases. The P-polarized light radiation component in the P-polarized light 11 accounts for exemplarily 70% or more, more exemplarily 90% or more, and most exemplarily 100%.

Meanwhile, the projection system of the head-up display system has a main wavelength equal to or above 460 nm, which is helpful to reduce the harm of blue light.

The projection system 100 of the present disclosure includes elements known to those skilled in the art, including but not limited to a laser, a light emitting diode (LED), a liquid crystal display (LCD), a digital light processor (DLP), an electroluminescent cell (EL), a cathode ray tube (CRT), a vacuum fluorescent display (VFD), a collimator, a spherical correcting lens, a convex lens, a concave lens, a reflector and/or a polarizer. Meanwhile, the position and the incident angle of the projection system 100 are adjustable to meet the requirements of different positions and heights.

Although the laminated glass illustrated in FIGS. 1 and 2 includes the inner glass plate 11, the outer glass plate 12 and the thermoplastic film 13, the laminated glass of the present disclosure may further include other substrates, including but not limited to materials such as PET and PMMA. The structure of the laminated glass structure of the present disclosure includes, but is not limited to, glass/thermoplastic film/glass/thermoplastic film, glass/thermoplastic film/PET/thermoplastic film/glass, PET/thermoplastic film/glass/thermoplastic film/glass, etc. Therefore, the laminated glass of the present disclosure at least includes the inner glass plate 11, the outer glass plate 12 and the thermoplastic film 13.

In order to meet the use safety requirements on the automobile glass, the outer glass plate 12 of the present disclosure adopts a physically strengthened curved glass plate with a thickness greater than or equal to 1.8 mm, which is obtained by a high-temperature heat treatment at least 560 °C and being bent. The inner glass plate 11 may also be a physically strengthened curved glass plate, but from the perspective of automobile lightweight, the inner glass plate 11 is exemplarily a non-physically strengthened curved glass plate with a thickness less than or equal to 1.6 mm. In order to make full use of the advantageous effects of the inner glass plate 11 of the present disclosure on the head-up system of the present disclosure, such as improving the projection brightness at certain incident angles, a thinner inner glass plate 11 is selected to obtain a better head-up display effect, exemplarily the inner glass plate 12 has a thickness of 0.7 mm to 1.2 mm, and the non-physically strengthened curved glass plate may be made of chemically strengthened soda-lime-silica glass, chemically strengthened aluminosilicate glass, chemically strengthened borosilicate glass, bulk strengthened soda-lime-silica glass, bulk strengthened aluminosilicate glass, or bulk strengthened borosilicate glass, etc. The chemical strengthening in the present disclosure is mainly to perform an exchange of ions with different ion radii on the glass surface, so that a high surface stress is generated on the glass surface in accompany with a stress layer depth, thereby improving the strength of the glass in terms of mechanical properties. The bulk strengthened glass in the present disclosure means that the original glass itself can be directly matched with another glass to form the laminated glass without physical strengthening or chemical strengthening, and the quality of the laminated glass meets the use standards of the laminated glass for automobiles, such as GB9656-2016 Automobile Safety Glass of China.

The inner glass plate 11 and the outer glass plate 12 of the present disclosure are connected together through the thermoplastic film 13. The thermoplastic film of the present disclosure may be made of at least one from a group consisting of polycarbonate (PC), polyvinyl chloride (PVC), polyvinyl butyral (PVB), ethylene vinyl acetate (EVA), polyacrylate (PA), polymethylmethacrylate (PMMA), ionic interlayer (SGP) or polyurethane (PU). Of course, the thermoplastic film 13 may be a single-layer structure, or a multi-layer structure such as a double-layer structure, a three-layer structure, a four-layer structure, a five-layer structure or the like. The thermoplastic film 13 may have other function. For example, at least one colored area is provided as a shadow zone to reduce the interference of sunlight on human eyes, an infrared absorber may be added to achieve a sun blocking or heat insulation function, an ultraviolet absorber may be added to achieve a ultraviolet insulation function, or the plasticizer content in one layer of the thermoplastic film 13 of the multi-layer structure is increased to achieve a sound insulation function. In order to eliminate the perspective ghosting caused by a scene in the external environment of the automobile through the windshield, thermoplastic film 13 exemplarily has a wedge-shaped cross-sectional profile with a wedge angle of 0.01 to 0.18 mrad, such as 0.05 mrad, 0.10 mrad, 0.15 mrad, 0.18 mrad, etc., so that even if the thermoplastic film 13 with a small wedge angle is used, it is possible to simultaneously eliminate the reflection ghosting and the perspective ghosting with a low cost, thereby obtaining a head-up display image with a higher quality and a better observation effect.

The visible light transmittance TL in the present disclosure is greater than or equal to 50%, and in order to meet the use safety requirement on the automobile glass, the visible light transmittance TL in the present disclosure is exemplarily greater than or equal to 70%.

In an embodiment of the present disclosure, since the second transparent nano-coating of the present disclosure includes the electrically conductive layers, which are suitable for electric heating and capable of quick dehumidifying, defogging and even deicing, the laminated glass of the present disclosure may also have an electric heating function, which is very suitable for power sources of 8 V to 48 V. When being provided with busbars 16 and 17, the transparent electrically conductive film may be connected to an electrode of a power source to introduce current into the transparent electrically conductive film over as large a portion of the glass plate width as possible. The busbars 16 and 17 may be one or more of silver paste, copper foil and aluminum foil. When the power supply voltage is 48 V and the width between busbars 16 and 17 on the glass plate is 0.7 m, it is possible to achieve an electric heating power greater than or equal to 3000 W/m$^2$.

In view of the above content, in order to further illustrate the solution, the following examples and Comparative Examples are provided. After the coating, the automobile glass is subjected to production processes such as baking and curving.

In the following Ag alloy, Ag has a mass percentage of 98%, and the rest is the doping element. For example, in AgNi, Ag has a mass percentage of 98%, and Ni has a mass percentage of 2%.

(1) Comparative Example 1

The structure of the laminated glass: the first transparent nano-coating/the inner glass plate 11/PVB/the second transparent nano-coating/the outer glass plate 12.

The system of the first transparent nano-coating: the inner glass plate 11/TZO (45.5 nm)/$SiO_2$ (120 nm), the TZO is ZnO-doped with a refractive index of 2.33.

The system of the second transparent nano-coating: the outer glass plate 12/ZnSnOx (19 nm)/ZnO (10 nm)/Ag (10.5 nm)/TiOx (6 nm)/ZnSnOx (66 nm)/ZnO (10 nm)/Ag (9.4 nm)/TiOx (5.3 nm)/ZnSnOx (6 nm).

The PVB has a thickness of 0.76 mm.

The inner glass plate 11 is made of soda-lime-silica glass with a thickness of 1.6 mm.

The outer glass plate 12 is made of soda-lime-silica glass with a thickness of 2.1 mm.

(2) Comparative Example 2

The structure of the laminated glass: the first transparent nano-coating/the inner glass plate 11/the second transparent nano-coating/PVB/the outer glass plate 12.

The system of the first transparent nano-coating: the inner glass plate 11/ZnSnOx (25.0 nm)/TiOx (44.0 nm)/$SiO_2$ (110 nm).

The system of the second transparent nano-coating: the inner glass plate 11/ZnSnOx (22.0 nm)/ZnO (10 nm)/Ag (7.5 nm)/NiCr (0.1 nm)/AZO (10 nm)/ZnSnOx (40 nm)/ZnO (10 nm)/Ag (8.0 nm)/NiCr (0.1 nm)/AZO (10 nm)/ZnSnOx (84.5 nm)/ZnO (10 nm)/Ag (7.5 nm)/NiCr (0.1 nm)/AZO (10 nm)/ZnSnOx (34 nm)/SiN (6 nm). The AZO is aluminum-doped zinc oxide.

The PVB has a thickness of 0.76 mm.

The inner glass plate 11 is made of soda-lime-silica glass with a thickness of 1.6 mm.

The outer glass plate 12 is made of soda-lime-silica glass with a thickness of 2.1 mm.

(3) Example 1

The structure of the laminated glass: the first transparent nano-coating/the inner glass plate 11/PVB/the second transparent nano-coating/the outer glass plate 12.

The system of the first transparent nano-coating: the fourth surface of the laminated glass/TiSnOx (60 nm)/$SiO_2$ (100 nm), where TiSnOx has a refractive index of 2.40.

The system of the second transparent nano-coating: the second surface of the laminated glass/ZnSnOx (43 nm)/ZnO (10 nm)/AgTi (7.4 nm)/AZO (10 nm)/ZnSnOx (96.7 nm)/SiN (5 nm), where Ti in AgTi has a mass percentage of 1%.

The PVB has a thickness of 0.76 mm.

The inner glass plate 11 is made of soda-lime-silica glass with a thickness of 1.6 mm.

The outer glass plate 12 is made of soda-lime-silica glass with a thickness of 2.1 mm.

(4) Example 2

The structure of the laminated glass: the first transparent nano-coating/the inner glass plate 11/PVB/the second transparent nano-coating/the outer glass plate 12.

The system of the first transparent nano-coating: the fourth surface of the laminated glass/TiOx (5 nm)/TiBiOx (100 nm)/$SiO_2$ (110 nm), where TiBiOx has a refractive index of 2.41.

The system of the second transparent nano-coating: the second surface of the laminated glass/ZnSnOx (43.5 nm)/Ag (11.9 nm)/ZnSnOx (111.2 nm)/Ag (6.0 nm)/ZnSnOx (40 nm)/SiZrN (5 nm).

The PVB has a thickness of 0.76 mm.

The inner glass plate 11 is made of soda-lime-silica glass with a thickness of 1.6 mm.

The outer glass plate 12 is made of soda-lime-silica glass with a thickness of 2.1 mm.

(5) Example 3

The structure of the laminated glass: the first transparent nano-coating/the inner glass plate 11/PVB/the second transparent nano-coating/the outer glass plate 12.

The system of the first transparent nano-coating: the fourth surface of the laminated glass/ZnSnMgOx (19.5 nm)/$SiO_2$ (10.0 nm)/TiOx (10.0 nm)/TiAlOx (38.0 nm)/$SiO_2$ (111 nm), where TiOx has a refractive index of 2.60 and TiAlOx has a refractive index of 2.50.

The system of the second transparent nano-coating: the third surface of the laminated glass/ZnSnNiOx (32.0 nm)/Ag (5.0 nm)/AZO (10 nm)/SiN (58.0 nm)/GZO (10 nm)/Ag (5.0 nm)/NiCr (0.3 nm)/AZO (10 nm)/ZnSnOx (74.8 nm)/SiN (5 nm). GZO is gallium doped zinc oxide.

The PVB has a thickness of 0.76 mm.

The inner glass plate 11 is made of aluminum borosilicate glass with a thickness of 0.7 mm.

The outer glass plate 12 is made of soda-lime-silica glass with a thickness of 2.1 mm.

(6) Example 4

The structure of the laminated glass: the first transparent nano-coating/the inner glass plate 11/PVB/the second transparent nano-coating/the outer glass plate 12.

The system of the first transparent nano-coating: the fourth surface of the laminated glass/TiOx (5.0 nm)/SiN (10.0 nm)/$SiO_2$ (10.0 nm)/TiOx (50.0 nm)/$SiO_2$ (108.0 nm), where TiOx has a refractive index of 2.58.

The system of the second transparent nano-coating: the third surface of the laminated glass/ZnSnOx (5.0 nm)/SiN (33.0 nm)/AZO (10.0 nm)/AgCu (11.3 nm)/ZnO (10.0 nm)/ZnSnSiOx (20.0 nm)/ZnSnOx (33.0 nm)/ZnO (10.0 nm)/Ag (6.6 nm)/AZO (10.0 nm)/ZnSnOx (64.5 nm)/AZO (10 nm)/AgTi (5.1 nm)/ZnO (10.0 nm)/ZnSnOx (20.0 nm)/SiN (35 nm).

The PVB has a thickness of 0.76 mm.

The inner glass plate 11 is made of $SiO_2$ glass with a thickness of 1.1 mm.

The outer glass plate 12 is made of soda-lime-silica glass with a thickness of 2.1 mm.

(7) Example 5

The structure of the laminated glass: the first transparent nano-coating/the inner glass plate 11/PVB/the second transparent nano-coating/the outer glass plate 12.

The system of the first transparent nano-coating: the fourth surface of the laminated glass/TiSnOx (10.8 nm)/$SiO_2$ (62.3 nm)/TiMgOx (14.0 nm)/$SiO_2$ (31.8 nm)/TiOx (76.7 nm)/$SiO_2$ (110.0 nm), where TiSnOx and TiMgOx have a refractive index of 2.50, and TiOx has a refractive index of 2.60.

The second transparent nano-coating system: the second surface of the laminated glass/ZnS nmnOx (10.0 nm)/SiN (45.0 nm)/AZO (10.0 nm)/AgCr (5.0 nm)/ZnO (10.0 nm)/ZnSnZr (5.0 nm)/ZnSnOx (60.0 nm)/ZnO (10.0 nm)/Ag (4.3 nm)/AZO (10.0 nm)/ZnSnOx (39.0 nm)/AZO (10 nm)/AgTi (5.0 nm)/ZnO (10.0 nm)/ZnSnOx (61.0 nm)/AZO (10.0 nm)/Ag (5.0 nm)/ZnO (10.0 nm)/ZnSnOx (20.0 nm)/ZnSnMgAlOx (10.0 nm)/SiN (5 nm).

The PVB has a thickness of 0.76 mm.

The inner glass plate 11 is made of soda-lime-silica glass with a thickness of 2.1 mm.

The outer glass plate 12 is made of soda-lime-silica glass with a thickness of 2.1 mm.

(8) Example 6

The structure of the laminated glass: the first transparent nano-coating/the inner glass plate 11/PVB/the second transparent nano-coating/the outer glass plate 12.

The system of the first transparent nano-coating: the fourth surface of the laminated glass/SiN (40.0 nm)/TiOx (50.0 nm)/$SiO_2$ (110.0 nm), where TiOx has a refractive index of 2.62.

The system of the second transparent nano-coating: the second surface of the laminated glass/SiN (20.0 nm)/ZnSnMgAlOx (10.0 nm)/AZO (10.0 nm)/AgNb (3.6 nm)/ZnO (10.0 nm)/ZnSnOx (60.5 nm)/ZnO (10.0 nm)/Ag (4.3 nm)/AZO (10.0 nm)/ZnSnOx (39.5 nm)/AZO (10 nm)/AgNiTi (5.0 nm)/ZnO (10.0 nm)/ZnSnOx (61.0 nm)/AZO (10.0 nm)/Ag (5.6 nm)/ZnO (10.0 nm)/ZnSnOx (20.0 nm)/ZnSnMgAlOx (8.0 nm)/SiN (5 nm).

The PVB has a thickness of 0.76 mm.

The inner glass plate 11 is made of borosilicate glass with a thickness of 2.1 mm.

The outer glass plate 12 is made of soda-lime-silica glass with a thickness of 2.1 mm.

In which, the comparison relationships between the P-polarized light characteristics in Comparative Examples 1 to 2 and Examples 1 to 6 and TL and Rds are shown in Table 1.

TABLE 1

P-polarized light characteristics in Comparative Examples 1 to 2 and Examples 1 to 6 and TL, Rds (%)

| | Single-sided P-polarized light | | | Absolute value of | Laminated glass P-polarized light | | | |
|---|---|---|---|---|---|---|---|---|
| | R1p | range1 | range2 | (range1 + range2) | Rp | Range | TL | Rds |
| Comparative Example 1 | 13.5% | 4.5% | 2.2% | 6.7% | 15.2% | 5.5% | 75.9% | 35.1% |
| Comparative Example 2 | 13.8% | −3.9% | −3.6% | 7.5% | 28.8% | 5.7% | 66.5% | 31.9% |
| Example 1 | 18% | −3.3% | −0.3% | 3.6% | 23.8% | 1.5% | 71.5% | 28.2% |
| Example 2 | 8% | −10.3% | 6.9% | 3.4% | 20.8% | 1% | 71.3% | 35.4% |
| Example 3 | 19.1% | −3.5% | −1.3% | 4.8% | 21.4% | 1.8% | 74.9% | 28.3% |
| Example 4 | 19.5% | −2.5% | −3.0% | 5.5% | 23.3% | 1.9% | 70.5% | 35.8% |
| Example 5 | 17.3% | −5.5% | 4.9% | 0.6% | 18.5% | 1% | 74.6% | 28.6% |
| Example 6 | 18.7% | −3.5% | 2.9% | 0.6% | 20.3% | 1% | 73.8% | 27.9% |

As can be seen from Table 1:

(1) The ranges of the P-polarized light of the laminated glass in Comparative Examples 1 and 2 are greater than 5% and are not smooth, even if range1 and range2 are both smooth as in Comparative Example 2, and TL may be less than 70%, so the automobile safety glass standard is not satisfied.

(2) Compared with Comparative Examples 1 and 2, Examples 1 to 6 have high Rp greater than 18% and even 20%, and very small ranges less than 2% and even less than or equal to 1%. However, the present disclosure has low requirements on the range of the single-sided P-polarized light reflection spectrum. Even if the range of the single-sided P-polarized light reflection spectrum reaches 10% or more, a small range (<2%) can be achieved by adjusting the second transparent nano-coating. Examples 1 to 5 have R1p greater than 8%, which is helpful to achieve high Rp. Examples 1 to 6 have a high visible light transmittance TL≥70%, which meets the TL requirements on the automobile windshield.

In addition, the comparison results of the visible light characteristics (tested on the side of the outer glass plate) in Comparative Examples 1 to 2 and Examples 1 to 6 are shown in Table 2.

TABLE 2

Visible light characteristics in Comparative Examples 1 to 2 and Examples 1 to 6 (tested on the side of the outer glass plate)

| | | Incident angle | | | | | |
|---|---|---|---|---|---|---|---|
| | | 10° | 30° | 45° | 50° | 60° | 70° |
| Comparative Example 1 | RL | 12.7% | 11.6% | 11.9% | 12.8% | 16.9% | 27.7% |
| | a | −2.8 | 0.3 | 3.6 | 4.4 | 4.9 | 3.2 |
| | b | −16.8 | −15.3 | −11 | −8.9 | −7.5 | −0.8 |
| Comparative Example 2 | RL | 21.3% | 20.4% | 20.6% | 21.2% | 24.6% | 33.6% |
| | a | −1.5 | 0.1 | 1.4 | 1.6 | 1.5 | 0.1 |
| | b | −9.2 | −8.8 | −5.2 | −2.4 | −1.0 | 0.9 |
| Example 1 | RL | 20.7% | 20.3% | 20.5% | 21.1% | 24.2% | 33% |
| | a | −3.6 | −2.9 | −2.1 | −1.8 | −1.3 | −1.1 |
| | b | −0.5 | −2.1 | −3.2 | −3.3 | −2.7 | −2 |
| Example 2 | RL | 19.6% | 18.9% | 19% | 19.6% | 22.3% | 31.8% |
| | a | 0.9 | −0.3 | −1.6 | −1.2 | −2.1 | −2.8 |
| | b | −6.7 | −5.1 | −3.8 | −3.6 | −3.4 | −2.3 |

TABLE 2-continued

Visible light characteristics in Comparative Examples 1 to 2 and Examples 1 to 6 (tested on the side of the outer glass plate)

| | | Incident angle | | | | | |
|---|---|---|---|---|---|---|---|
| | | 10° | 30° | 45° | 50° | 60° | 70° |
| Example 3 | RL | 16.3% | 15.7% | 16.3% | 17.1% | 21% | 31.3% |
| | a | −6.2 | −4.9 | −3.4 | −2.9 | −2.2 | −2.5 |
| | b | −9 | −7.4 | −4.7 | −3.6 | −1.7 | −0.3 |
| Example 4 | RL | 17.3% | 16.3% | 16.4% | 17.1% | 20.7% | 30.6% |
| | a | −7.2 | −7.3 | −5.5 | −4.4 | −1.7 | −0.2 |
| | b | −1.9 | −1.1 | −0.6 | −0.4 | 0.4 | 1.2 |
| Example 5 | RL | 13.5% | 12.3% | 12.2% | 12.8% | 16.4% | 26.9% |
| | a | −3.1 | −1.5 | 0.3 | 1.2 | 2.5 | 1.9 |
| | b | −9.1 | −9.3 | −9 | −8.5 | −5.7 | −2.1 |
| Example 6 | RL | 13.1% | 12.3% | 12.5% | 13.3% | 17.2% | 27.7% |
| | a | −4.8 | −3.9 | −2.3 | −1.8 | −0.8 | −0.2 |
| | b | −3.8 | −4.3 | −3.7 | −3.1 | −1.4 | −0.3 |

The comparison results of the visible light characteristics (tested on the side of the inner glass plate) in Comparative Examples 1 to 2 and Examples 1 to 6 are shown in Table 3.

TABLE 3

Visible light characteristics in Comparative Examples 1 to 2 and Examples 1 to 6 (tested on the side of the inner glass plate)

| | | Incident angle | | | | | |
|---|---|---|---|---|---|---|---|
| | | 10° | 30° | 45° | 50° | 60 | 70° |
| Comparative Example 1 | RL | 13.1% | 11.2% | 11.8% | 12.5% | 16.3% | 26.8% |
| | a | −1.5 | 1.9 | 5.6 | 6.6 | 7.3 | 5.4 |
| | b | −17.3 | −16.8 | −15.3 | −12.8 | −10.3 | −0.1 |
| Comparative Example 2 | RL | 23.1% | 22.1% | 22.2% | 22.8% | 25.7% | 34.2% |
| | a | 1.1 | 3.3 | 5.1 | 5.6 | 6.0 | 5.1 |
| | b | −15.1 | −13.5 | −9.8 | −7.8 | −3.6 | 0.2 |
| Example 1 | RL | 19.3% | 18.9% | 19.3% | 19.9% | 23.2% | 32.2% |
| | a | −3.3 | −2.8 | −2.2 | −1.9 | −1.4 | −1.2 |
| | b | −0.2 | −1.5 | −2.3 | −2.5 | −2.4 | −2.3 |
| Example 2 | RL | 19% | 18.3% | 18.3% | 18.7% | 21.5% | 29.9% |
| | a | −0.1 | −1.7 | −3.6 | −4.2 | −4.8 | −4.6 |
| | b | −3.6 | −1.6 | −0.4 | −0.7 | −1.1 | −1.3 |
| Example 3 | RL | 16.7% | 16.1% | 16.4% | 17.2% | 20.9% | 30.9% |
| | a | −5.4 | −3.6 | −4 | −1.5 | −0.8 | −0.3 |
| | b | −9.7 | −9.2 | −6 | −4.6 | −1.4 | 0.1 |
| Example 4 | RL | 18.6% | 17.6% | 17.5% | 18.1% | 21.3% | 30.2% |
| | a | −5.1 | −5.1 | −3.4 | −2.3 | 0.3 | 1.3 |
| | b | −4.3 | −3.1 | −1.4 | −0.6 | 1.1 | 0.7 |
| Example 5 | RL | 14.5% | 13.3% | 12.8% | 13.2% | 16.3% | 26% |
| | a | −6.2 | −4.6 | −0.9 | 0.7 | 1.7 | 2.7 |
| | b | −3.3 | −4.4 | −5 | −4.9 | −3.8 | −1.5 |
| Example 6 | RL | 14% | 13% | 13.1% | 13.7% | 17.1% | 26.8% |
| | a | −3.9 | −3.7 | −3.2 | −1.9 | −0.8 | −0.2 |
| | b | −4.9 | −4.8 | −3.3 | −2.5 | −1.6 | −0.6 |

As can be seen from Tables 2 and 3, on the side of the inner glass plate, the value b in Comparative Example 1 tends to be negative and the color tends to be blue at some angles, and at some angles, the value a in Comparative Example 2 tends to be positive and the color tends to be red, meanwhile, the value b tends to be negative. However, in Examples 1 to 6, good appearances can be achieved in the range of the incidence angle from 0° to 70°, including the tests on the side of the inner glass plate and the side of the the outer glass plate.

The embodiments listed above in the present disclosure all describe the structural composition of the head-up display system, but the specific film deposition process and parameters or the specific manufacturing process and parameters of the laminated glass are not described. It can be understood that those undescribed are well known to persons of ordinary skill in the art, and do not affect the protection scope of the present disclosure.

The embodiments of the present disclosure are all described in a progressive manner, and the same or similar parts of the embodiments can refer to each other. Each embodiment lays an emphasis on its distinctions from other embodiments. In the description of the present disclosure, the description with reference to the terms such as “an embodiment”, “some embodiments”, “example”, “specific example” or “some examples” means that the specific features, structures, materials or characteristics described in conjunction with the embodiment(s) or example(s) are included in at least one embodiment or example of the present disclosure. In the present disclosure, the schematic expressions of the above terms are not necessarily aimed at the same embodiment or example. Moreover, the specific features, structures, materials or characteristics described may be combined in any one or more embodiments or examples in a suitable manner. In addition, different embodiments or examples and the features thereof described in the present disclosure can be combined and incorporated by those skilled in the art without being contradictory to each other.

Those described above are only examples of the embodiments of the present disclosure, rather than limitations thereto. Various modifications and variations can be made to the embodiments of the present disclosure by those skilled in the art. Any modification, equivalent substitution, improvement, etc. made within the spirit and principle of the embodiments of the present disclosure should be included in the scope of the claims of the embodiment of the present disclosure.

What is claimed is:

1. A laminated glass, comprising an inner glass plate, an outer glass plate and an interlayer film sandwiched therebetween, a side of the inner glass plate away from the interlayer film being provided with a first transparent nano-coating for reflecting P-polarized light, and the first transparent nano-coating comprising at least one stacked structure composed of a high-refractive-index material layer and a low-refractive-index material layer sequentially deposited outwards from a surface of the inner glass plate, wherein a second transparent nano-coating attached to the interlayer film is sandwiched between the inner glass plate and the outer glass plate, the second transparent nano-coating comprises dielectric layers and electrically conductive layers, and each of the electrically conductive layers is sandwiched between two of the dielectric layers;

wherein the high-refractive-index material layer has a refractive index greater than or equal to 1.9, the low-refractive-index material layer has a refractive index less than or equal to 1.8, and the laminated glass has a P-polarized light reflectivity Rp greater than or equal to 16% at an incident angle of 65°;

wherein the reflection spectrum corresponding to the P-polarized light reflectivity Rp of the laminated glass at the incident angle of 65 ° has a range less than or equal to 4% in the wavelength range from 460 nm to 630 nm.

2. The laminated glass according to claim 1, wherein a single-sided P-polarized light reflectivity R1p of the first transparent nano-coating at the incident angle of 65 ° is greater than or equal to 6%.

3. The laminated glass according to claim 1, wherein a P-polarized light reflection spectrum corresponding to a single-sided P-polarized light reflectivity R1p of the first transparent nano-coating at the incident angle of 65° has a range named range1 in the wavelength range from 460 nm to 630 nm;

a P-polarized light reflection spectrum corresponding to a single-sided P-polarized light reflectivity R2p of the second transparent nano-coating at the incident angle of 65° has a range named range2 in the wavelength range from 460 nm to 630 nm;

wherein |range1+range2|≤6%.

4. The laminated glass according to claim 1, a P-polarized light reflection spectrum corresponding to a single-sided P-polarized light reflectivity R1p of the first transparent nano-coating at the incident angle of 65° has a range named range1≤12% in the wavelength range from 460 nm to 630 nm.

5. The laminated glass according to claim 1, wherein a P-polarized light reflection spectrum corresponding to a single-sided P-polarized light reflectivity R2p of the second transparent nano-coating at the incident angle of 65° has a range named range2≤8% in the wavelength range from 460 nm to 630 nm.

6. The laminated glass according to claim 1, wherein the high-refractive-index material layer comprises a first compound comprising at least one from a group consisting of an oxide of Ti, an oxynitride of Ti, a nitride of Ti and a Ti metal;

the low-refractive-index material layer comprises a second compound comprising at least one from a group consisting of an oxide of Si, an oxynitride of Si, a carbon oxide of Si, an oxide of Al and a mixture of thereof.

7. The laminated glass according to claim 1, wherein the first transparent nano-coating comprises a first high-refractive-index material layer and a first low-refractive-index material layer;

the first high-refractive-index material layer has a thickness between 45 nm and 120 nm, and the first low-refractive-index material layer has a thickness between 90 nm and 200 nm;

the first transparent nano-coating comprises a first high-refractive-index material layer, a first low-refractive-index material layer, a second high-refractive-index material layer and a second low-refractive-index material layer which are sequentially arranged;

the first high-refractive-index material layer has a thickness between 1 nm and 60 nm, and the second high-refractive-index material layer has a thickness between 45 nm and 80 nm;

the first low-refractive-index material layer has a thickness between 1 nm and 200 nm, and the second low-refractive-index material layer has a thickness between 90 nm and 200 nm; or the first transparent nano-coating comprises a first high-refractive-index material layer, a first low-refractive-index material layer, a second high-refractive-index material layer, a second low-refractive-index material layer, a third high-refractive-index material layer and a third low-refractive-index material layer which are sequentially arranged, at least one from a group consisting of the first high-refractive-index material layer, the second high-refractive-index material layer and the third high-refractive-index material layer has a thickness between 45 nm and 80 nm, at least one from a group consisting of the first low-refractive-index material layer, the second low-refractive-index material layer and the third low-refractive-index material layer has a thickness between 90 nm and 200 nm.

8. The laminated glass according to claim 1, wherein the first transparent nano-coating comprises a metal layer;

the metal layer comprises at least one from a group consisting of Ti, Zr, Nb, Si, Sb, Sn, Zn, In, Al, Ni, Cr, Mg, Mn, V, W, Hf, Ta, Mo, Ga, Y, Bi, Ta, Fe and rare earth elements; and/or the first transparent nano-coating comprises a non-stoichiometric metal compound, the non-stoichiometric metal compound comprises at least one from a group consisting of Zr, Nb, Si, Sb, Sn, Zn, In, Al, Ni, Cr, Mg, Mn, V, W, Hf, Ta, Mo, Ga, Y, Bi, Ta, Fe and rare earth elements.

9. The laminated glass according to claim 1, wherein the first transparent nano-coating is provided with an improving layer to improve the properties of the first transparent nano-coating;

the improving layer comprises at least one from a group consisting of a high-refractive-index material layer, a hydrophobic material layer and a hydrophilic material layer, high-refractive-index material layer has a thickness less than or equal to 20 nm, the hydrophobic material layer has a contact angle greater than or equal to 100°, the hydrophilic material layer has a contact angle less than or equal to 20°.

10. The laminated glass according to claim 1, wherein the second transparent nano-coating comprises a first dielectric layer, a first electrically conductive layer and a second dielectric layer which are sequentially arranged;

wherein the first dielectric layer has a thickness greater than or equal to 40 nm, and the second dielectric layer has a thickness greater than or equal to 50 nm;

the first electrically conductive layer has a thickness between 2 nm and 8 nm.

11. The laminated glass according to claim 1, wherein the second transparent nano-coating comprises a first dielectric layer, a first electrically conductive layer, a second dielectric layer, a second electrically conductive layer and a third dielectric layer which are sequentially arranged;

wherein the first dielectric layer has a thickness greater than or equal to 25 nm, the second dielectric layer has a thickness greater than or equal to 60 nm, and the third dielectric layer has a thickness greater than or equal to 40 nm;

the first electrically conductive layer and/or the second electrically conductive layer has a thickness less than or equal to 8.0 nm.

12. The laminated glass according to claim 1, wherein the second transparent nano-coating comprises a first dielectric layer, a first electrically conductive layer, a second dielectric layer, a second electrically conductive layer, a third dielectric layer, a third electrically conductive layer and a fourth dielectric layer which are sequentially arranged;

wherein the first dielectric layer has a thickness greater than or equal to 25 nm, the second dielectric layer has a thickness greater than or equal to 60 nm, the third dielectric layer has a thickness greater than or equal to 50 nm, and the fourth dielectric layer has a thickness greater than or equal to 30 nm;

the first electrically conductive layer has a thickness between 5 nm and 12 nm, and the second electrically conductive layer and the third electrically conductive layer each has a thickness between 2 nm and 8 nm.

13. The laminated glass according to claim 1, wherein the second transparent nano-coating comprises a first dielectric layer, a first electrically conductive layer, a second dielectric layer, a second electrically conductive layer, a third dielectric layer, a third electrically conductive layer, a fourth dielectric layer, a fourth electrically conductive layer and a fifth dielectric layer which are sequentially arranged;

wherein the first electrically conductive layer, the second electrically conductive layer, the third electrically conductive layer and the fourth electrically conductive layer each has a thickness less than or equal to 8 nm.

14. The laminated glass according to claim 1, wherein the second transparent nano-coating comprises a first dielectric layer, a first electrically conductive layer, a second dielectric layer, a second electrically conductive layer, a third dielectric layer, a third electrically conductive layer, a fourth dielectric layer, a fourth electrically conductive layer, a fifth dielectric layer, a fifth electrically conductive layer and a sixth dielectric layer which are sequentially arranged;

wherein the first electrically conductive layer, the second electrically conductive layer, the third electrically conductive layer, the fourth electrically conductive layer and the fifth electrically conductive layer each has a thickness less than or equal to 8 nm.

15. The laminated glass according to claim 1, wherein a red-green value a in visible light reflection colors of the laminated glass within an incident angle range of 0° to 60° has a numerical range of $-10 \leq a \leq 4$;

a yellow-blue value b in the visible light reflection colors of the laminated glass within the incident angle range of 0° to 60° has a numerical range of $-10 \leq b \leq 4$.

16. A head-up display system, comprising a projection system and the laminated glass according to claim 1.

17. The laminated glass according to claim 1, wherein the second transparent nano-coating has a single-sided P-polarized light reflectivity R2p, R2p is greater than or equal to 2%;

the distance H from the second transparent nano-coating to the first transparent nano-coating is less than or equal to 1.8 mm, and/or the interlayer film is a wedge-shaped interlayer film with a wedge angle of 0.3 mrad to 0.8 mrad.

18. The laminated glass according to claim 1, wherein the first transparent nano-coating has a P-polarized light reflectivity R1p, the ratio R1p/Rp is greater than or equal to 0.9; and/or the second transparent nano-coating has a single-sided P-polarized light reflectivity R2p, R2p is less than 2%.

19. The laminated glass according to claim 1, wherein the laminated glass is provided with busbars, the second transparent nano-coating is connected to an electrode of a power source of 8 V to 48 V to introduce current into the second transparent nano-coating, the busbars are one or more of silver paste, copper foil and aluminum foil.

* * * * *